US012412565B2

(12) United States Patent
Thyssen et al.

(10) Patent No.: US 12,412,565 B2
(45) Date of Patent: Sep. 9, 2025

(54) PREDICTION BASED WAKE-WORD DETECTION AND METHODS FOR USE THEREWITH

(71) Applicant: Syntiant Corp., Irvine, CA (US)

(72) Inventors: Jes Thyssen, San Juan Capistrano, CA (US); Christian Vejlbo, Frederikssund (DK)

(73) Assignee: Syntiant Corp., Irvine, CA (US)

(*) Notice: Subject to any disclaimer, the term of this patent is extended or adjusted under 35 U.S.C. 154(b) by 330 days.

(21) Appl. No.: 18/069,308

(22) Filed: Dec. 21, 2022

(65) Prior Publication Data

US 2023/0245648 A1    Aug. 3, 2023

Related U.S. Application Data

(60) Provisional application No. 63/267,250, filed on Jan. 28, 2022.

(51) Int. Cl.
*G10L 15/08* (2006.01)

(52) U.S. Cl.
CPC ........ *G10L 15/08* (2013.01); *G10L 2015/088* (2013.01)

(58) Field of Classification Search
CPC ... G10L 15/08; G10L 2015/088; G10L 17/00; G10L 15/32; H04B 3/23
USPC ....................................................... 704/251
See application file for complete search history.

(56) References Cited

U.S. PATENT DOCUMENTS

| | | | | |
|---|---|---|---|---|
| 6,456,978 | B1* | 9/2002 | Wymore | H04N 21/440236 |
| | | | | 386/E5.043 |
| 10,152,973 | B2* | 12/2018 | Hoffmeister | G10L 15/22 |
| 10,362,165 | B2* | 7/2019 | De Los Reyes | G10L 17/00 |
| 10,937,425 | B2* | 3/2021 | Summa | A63F 13/21 |
| 11,564,053 | B1* | 1/2023 | Soman | H04S 7/304 |
| 11,610,578 | B2* | 3/2023 | Shah | G10L 15/08 |
| 11,657,804 | B2* | 5/2023 | Prasad | G10L 15/18 |
| | | | | 704/257 |
| 2009/0228277 | A1* | 9/2009 | Bonforte | G06F 16/632 |
| | | | | 704/E17.001 |
| 2009/0259466 | A1* | 10/2009 | Stubley | G10L 15/08 |
| | | | | 704/240 |
| 2012/0016678 | A1* | 1/2012 | Gruber | G06F 40/40 |
| | | | | 704/E21.001 |
| 2013/0339019 | A1* | 12/2013 | Giancarlo | G10L 15/04 |
| | | | | 704/251 |
| 2013/0339028 | A1* | 12/2013 | Rosner | G10L 15/22 |
| | | | | 704/E11.001 |
| 2014/0365228 | A1* | 12/2014 | Ng-Thow-Hing | G06F 3/017 |
| | | | | 704/275 |

(Continued)

*Primary Examiner* — Thuykhanh Le
(74) *Attorney, Agent, or Firm* — Katz Ruby & Carle LLC; Bruce E. Stuckman

(57) ABSTRACT

An audio processing circuit includes an audio front end (AFE) configured to generate audio data in response to audio signals received from one or more microphones. One or more special purpose engines (SPEs) are configured to: generate prediction data via a usage model; generate bias adjustment data based on the prediction data; adjust a threshold of an audio event recognition engine based on the prediction data; and determine, via the audio event recognition engine and based on audio data, when an audio event is detected.

20 Claims, 16 Drawing Sheets

(56) References Cited

U.S. PATENT DOCUMENTS

| | | | |
|---|---|---|---|
| 2015/0081296 A1* | 3/2015 | Lee | G10L 25/48 |
| | | | 704/251 |
| 2015/0120300 A1* | 4/2015 | Maruta | G06F 3/167 |
| | | | 704/251 |
| 2016/0077794 A1* | 3/2016 | Kim | G10L 15/20 |
| | | | 704/275 |
| 2017/0060994 A1* | 3/2017 | Byron | G10L 15/22 |
| 2019/0094034 A1* | 3/2019 | Aist | G01C 21/3469 |
| 2021/0035571 A1* | 2/2021 | Yun | G06V 10/143 |
| 2021/0097982 A1* | 4/2021 | Nowak-Przygodzki | |
| | | | G10L 25/51 |
| 2021/0165825 A1* | 6/2021 | Tanaka | G06F 16/61 |
| 2021/0390948 A1* | 12/2021 | Shah | G10L 15/08 |
| 2021/0409548 A1 | 12/2021 | Unruh | |
| 2022/0027926 A1* | 1/2022 | Heiser | G06Q 30/0241 |
| 2022/0101853 A1* | 3/2022 | Kim | G10L 15/30 |
| 2022/0115033 A1* | 4/2022 | Huffman | G06N 3/08 |
| 2022/0148034 A1* | 5/2022 | Min | G06Q 30/0256 |
| 2022/0284883 A1* | 9/2022 | Buchter | G10L 15/20 |
| 2023/0154470 A1* | 5/2023 | Yang | G06F 3/167 |
| | | | 704/235 |
| 2023/0197211 A1* | 6/2023 | Yoon | G16H 50/20 |
| | | | 705/2 |
| 2023/0206908 A1* | 6/2023 | Shah | G10L 15/065 |
| | | | 704/251 |
| 2023/0223041 A1* | 7/2023 | Mosayyebpour Kaskari | |
| | | | G10L 21/0208 |
| | | | 704/233 |
| 2023/0223042 A1* | 7/2023 | Mosayyebpour Kaskari | |
| | | | G10L 21/0216 |
| | | | 704/233 |
| 2024/0231563 A1* | 7/2024 | Xiao | G06F 3/0486 |

\* cited by examiner

300

600

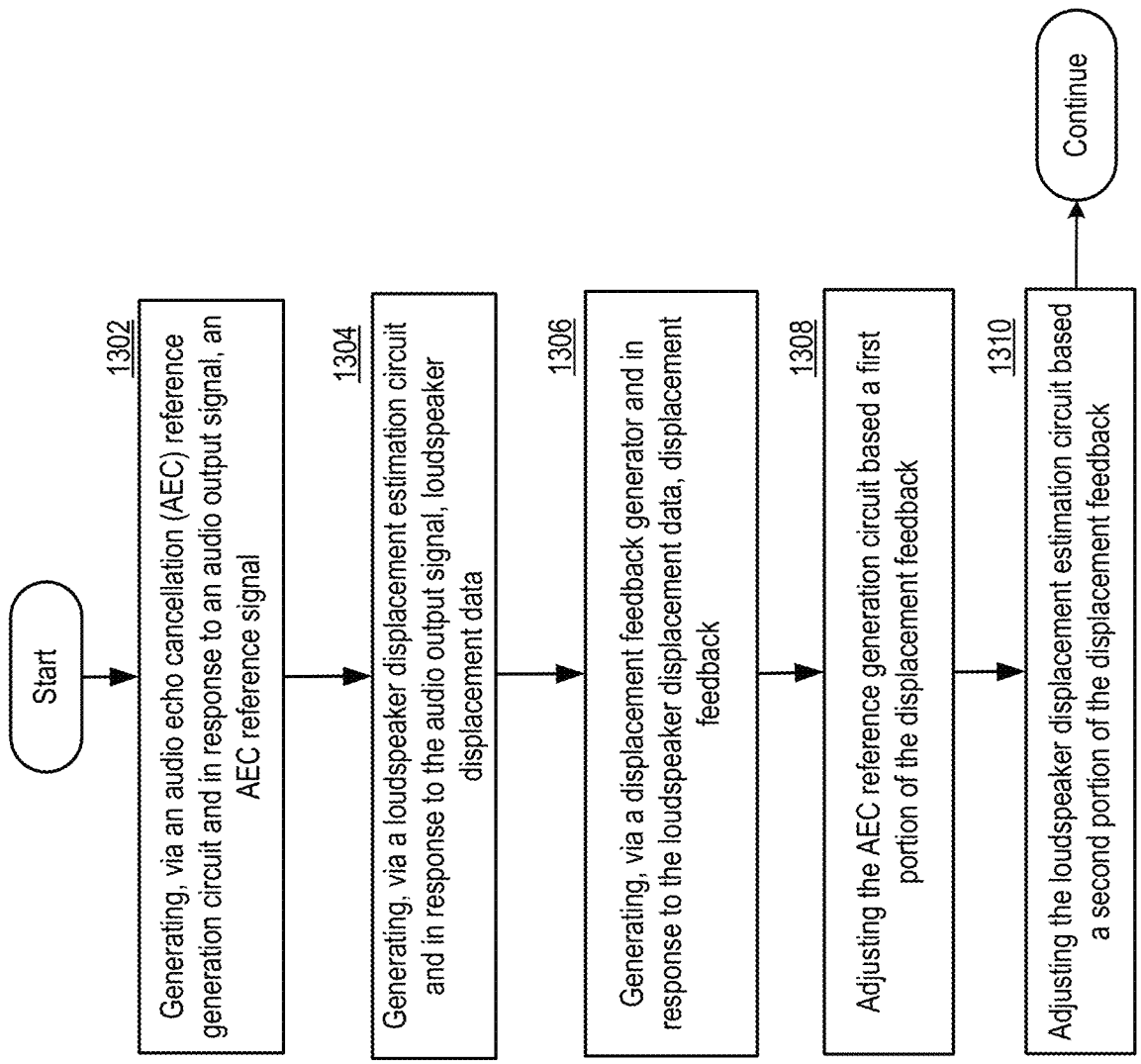

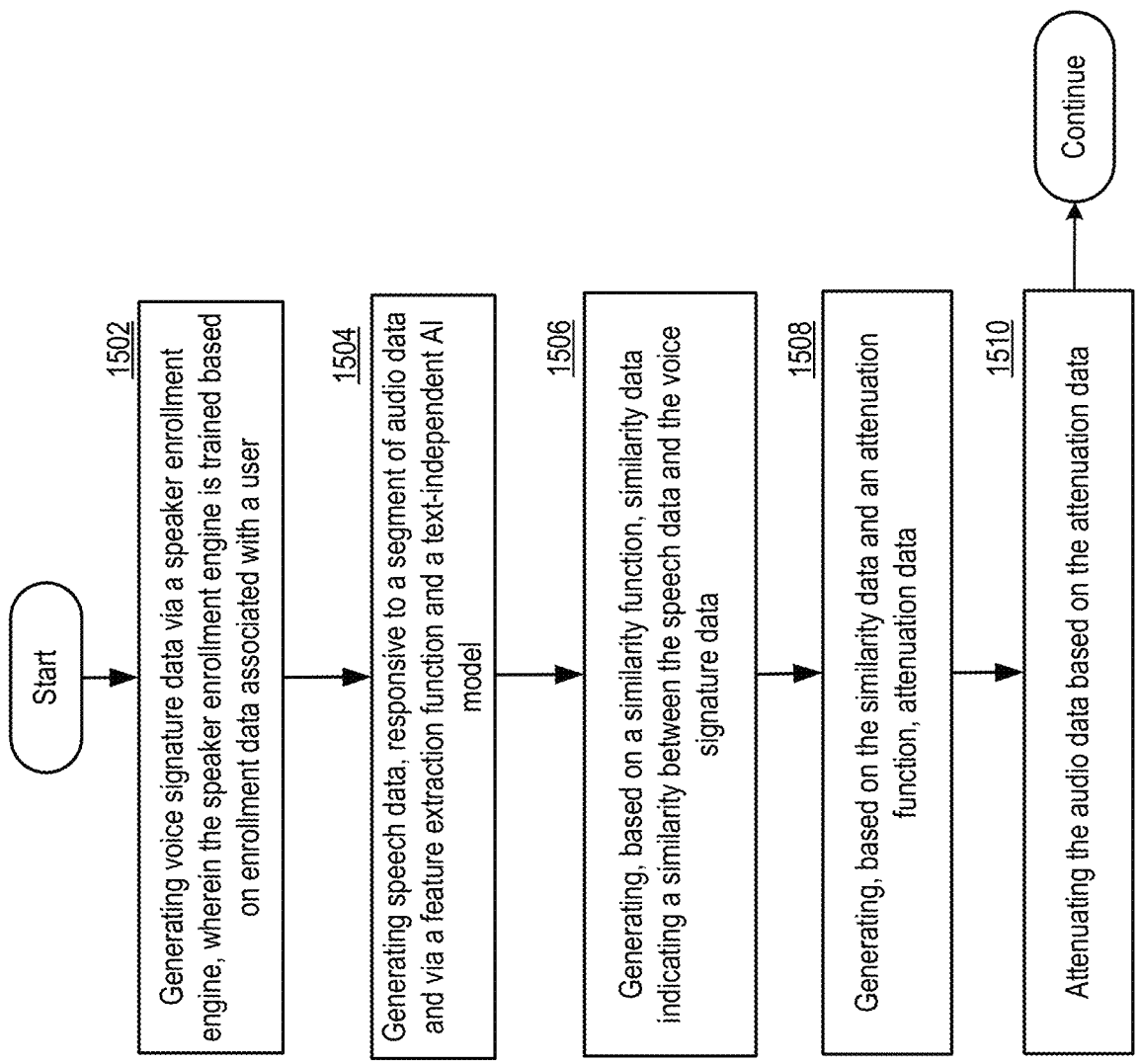

PREDICTION BASED WAKE-WORD DETECTION AND METHODS FOR USE THEREWITH

CROSS-REFERENCE TO RELATED APPLICATIONS

The present U.S. Utility Patent application claims priority pursuant to 35 U.S.C. § 119(e) to U.S. Provisional Application No. 63/267,250, entitled "SPEAKER RECOGNITION BASED AUDIO PROCESSING AND METHODS FOR USE THEREWITH", filed Jan. 28, 2022, which is hereby incorporated herein by reference in its entirety and made part of the present U.S. Utility Patent Application for all purposes.

FIELD OF THE DISCLOSURE

The subject disclosure relates to circuits and systems for audio signal processing and associated client devices that process audio input.

BRIEF DESCRIPTION OF THE DRAWINGS

Reference will now be made to the accompanying drawings, which are not necessarily drawn to scale, and wherein:

FIG. 13 illustrates a flow diagram of an example method in accordance with various aspects described herein.

FIG. 15 illustrates a flow diagram of an example method in accordance with various aspects described herein.

DETAILED DESCRIPTION

Figure 1:
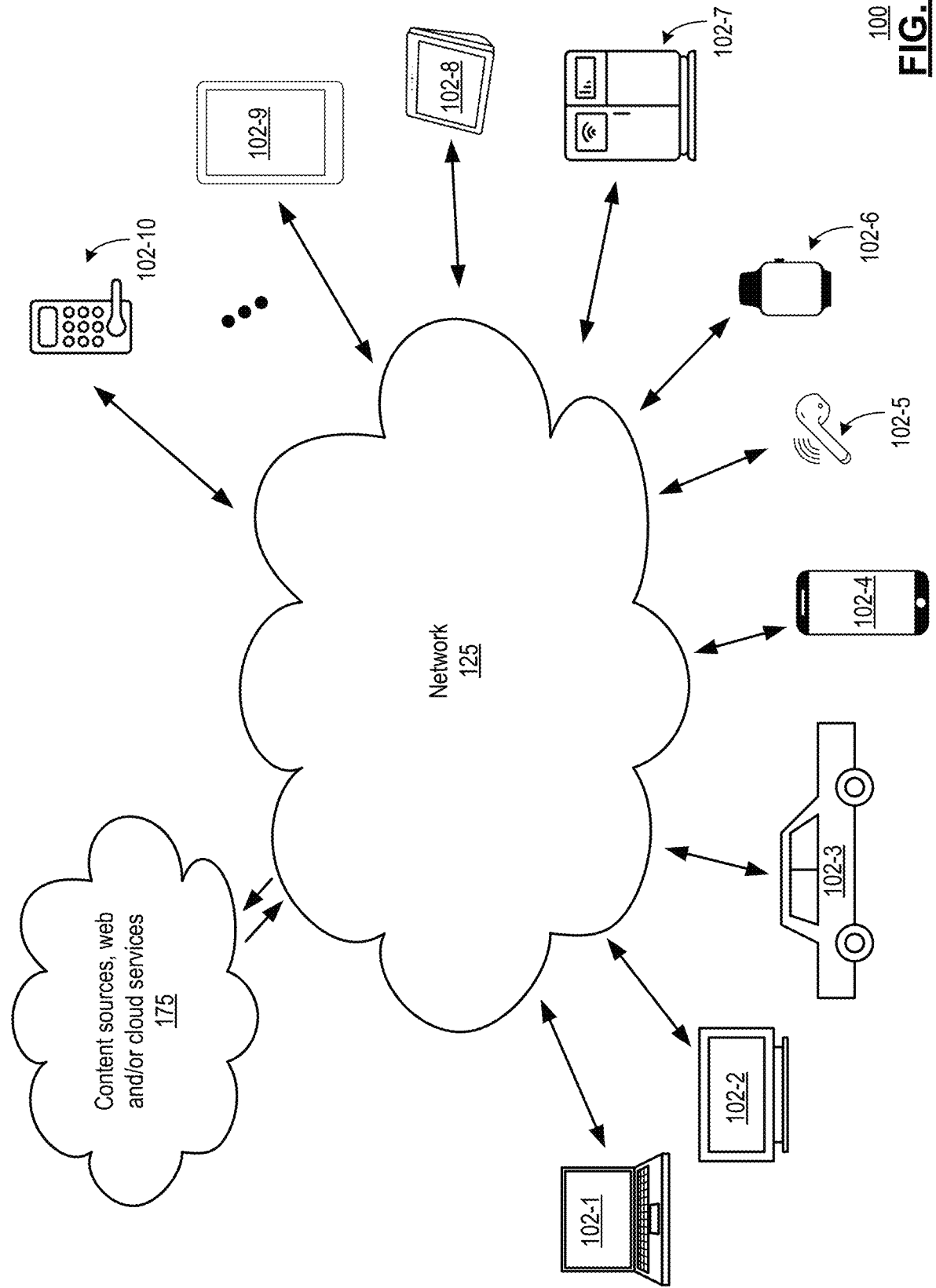
FIG. 1 is a pictorial block diagram illustrating example client devices in accordance with various aspects described herein.

One or more examples are now described with reference to the drawings, wherein like reference numerals are used to refer to like elements throughout. In the following description, for purposes of explanation, numerous details are set forth in order to provide a thorough understanding of the various examples. It is evident, however, that the various examples can be practiced without these details.

FIG. 1 is a pictorial block diagram illustrating example client devices in accordance with various aspects described herein. As shown, these client devices (generically, 102-$x$) include a laptop of other personal computer 102-1, a smart television or other video display device 102-2, a connected car or other vehicle 102-3, a smart phone or other personal communication device 102-4, an earbud of other personal audio device 102-5, a smart watch or other wearable device 102-6, a connected refrigerator or other smart appliance 102-7, a smart speaker or other audio/video hub device 102-8, a tablet or other handheld computing device 102-9, and a smart lock or other Internet of things (IoT) device 102-10. Each of these client devices 102-$x$ includes a network interface for communicating with via a network 125. Examples of such network interfaces includes a Bluetooth transceiver, an Ultra-Wideband (UWB) transceiver, a WiFi transceiver, a 4G, 5G or other cellular data transceiver, a WIMAX transceiver, a ZigBee transceiver or other wired or wireless communication interface.

In various examples, the network 125 can facilitate communication between client devices 102-$x$ and/or between a client device 102-$x$ and one or more content sources, web servers and/or cloud services 175. The network 125 can include the Internet or other wide area network, a home network, a virtual private network or other private network, a personal area network and/or other data communication network including wired, optical and/or wireless links.

The client devices 102-$x$ include circuits and systems for audio signal processing and, in operation, the client devices 102-$x$ process audio input as described in conjunction with one or more Figures that follow.

Figure 2:
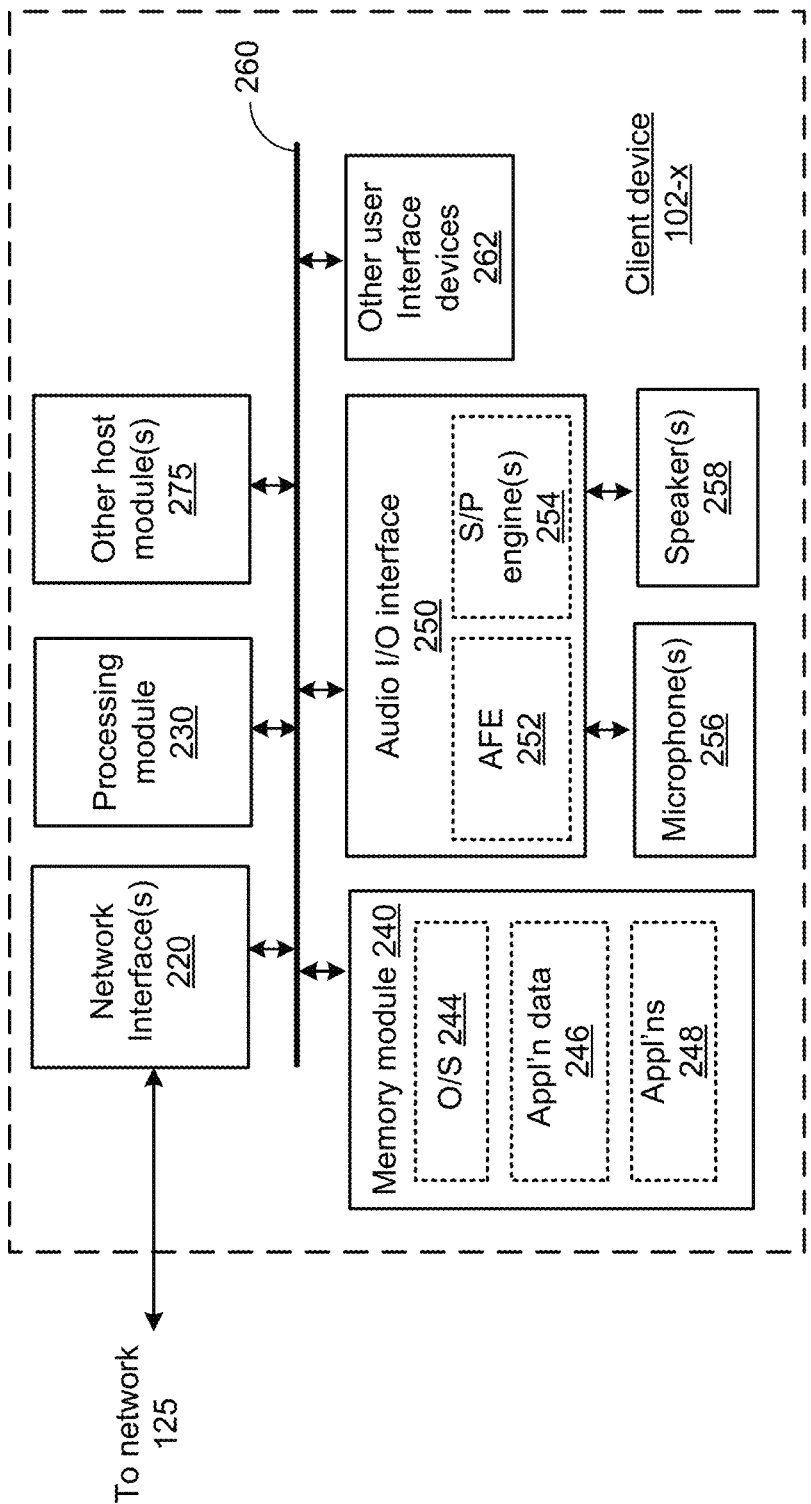
FIG. 2 is a block diagram illustrating an example client device in accordance with various aspects described herein.

FIG. 2 is a block diagram illustrating an example client device in accordance with various aspects described herein. In particular, a client device 102-$x$ is presented that includes a network interface 220 such as a 4G, 5G or other cellular wireless transceiver, a Bluetooth transceiver, a WiFi transceiver, UltraWideBand transceiver, WIMAX transceiver, ZigBee transceiver or other wireless interface, a Universal Serial Bus (USB) interface, an IEEE 1394 Firewire interface, an Ethernet interface or other wired interface and/or other network card or modem for communicating for communicating via network 115.

The client device 102-$x$ also includes an audio input/output (I/O) interface 250 that includes an audio front end (AFE) 252 and one or more special purpose (S/P) engines 254 that each can be implemented via analog or digital circuitry and/or combinations thereof. In operation, the audio I/O interface 250 operates via one or more microphones 256 to receive audio input signals and produce output data in response thereto that can be used via the processing module 230 and/or other host modules 275 to perform the functions of the client device 102-$x$ and/or to be transmitted to network 125 via network interface 220. Furthermore, audio output received by the audio I/O interface can be converted to audio via one or more loudspeakers 258.

The audio I/O interface 250, via AFE 252 and/or one or more special purpose (S/P) engines 254 process audio input as described in conjunction with one or more figures that follow. While the S/P engine(s) 254 are shown as being internal to the audio I/O interface 250, one or more of the S/P engine(s) 254 and/or one or more components thereof can be implemented via other elements of client device 102-*x*. For example, one or more processing functions performed by the S/P engine(s) 254 can be implemented via a dedicated or shared processing device, such as a digital signal processor and/or other circuitry of the processing module 230.

In various examples, the audio I/O interface 250 facilitates operations of the client device 102-*x* such as always-on voice (AOV) including wake-word detection and query processing, the processing of voice commands, other speech and speaker recognition applications, the processing of other voice and audio inputs, the generation of audio prompts, and/or the processing of voice and other audio in the support of other audio applications.

The client device 102-*x* can include one or more other user interface (I/F) devices 262 such as a display device, touch screen, key pad, touch pad, joy stick, thumb wheel, a mouse, one or more buttons, an accelerometer, gyroscope or other motion or position sensor, video camera or other interface devices that provide information to a user of the client device 102-*x* and that generate data in response to the user's interaction with the client device 102-*x*.

The client device 102-*x* also includes a processing module 230 and memory module 240 that stores an operating system (O/S) 244 such as an Apple, Unix, Linux Android or Microsoft operating system or other operating system, application data 246 associated with one or more applications 248 and/or other data, utilities and routines. In particular, the O/S 244 and applications 248 include operational instructions that, when executed by the processing module 230, cooperate to configure the processing module 230 into a special purpose device to perform the particular functions of the client device 102-*x* described herein in conjunction with the audio I/O interface 250, microphones 256, speakers 258, other interface devices 262, and/or one or more other host modules 275. While a particular bus architecture is presented that includes a single bus 260, other architectures are possible including additional data buses and/or direct connectivity between one or more elements. Further, the client device 102-*x* can include one or more additional elements that are not specifically shown.

The processing module 230 can be implemented via a single processing device or a plurality of processing devices. Such processing devices can include a microprocessor, micro-controller, digital signal processor, microcomputer, central processing unit, quantum computing device, field programmable gate array, programmable logic device, state machine, logic circuitry, analog circuitry, digital circuitry, and/or any device that manipulates signals (analog and/or digital) based on operational instructions that are stored in a memory, such as memory 240. The memory module 240 can include a hard disc drive or other disc drive, read-only memory, random access memory, volatile memory, non-volatile memory, static memory, dynamic memory, flash memory, cache memory, and/or any device that stores digital information. Note that when the processing device implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Figure 3:
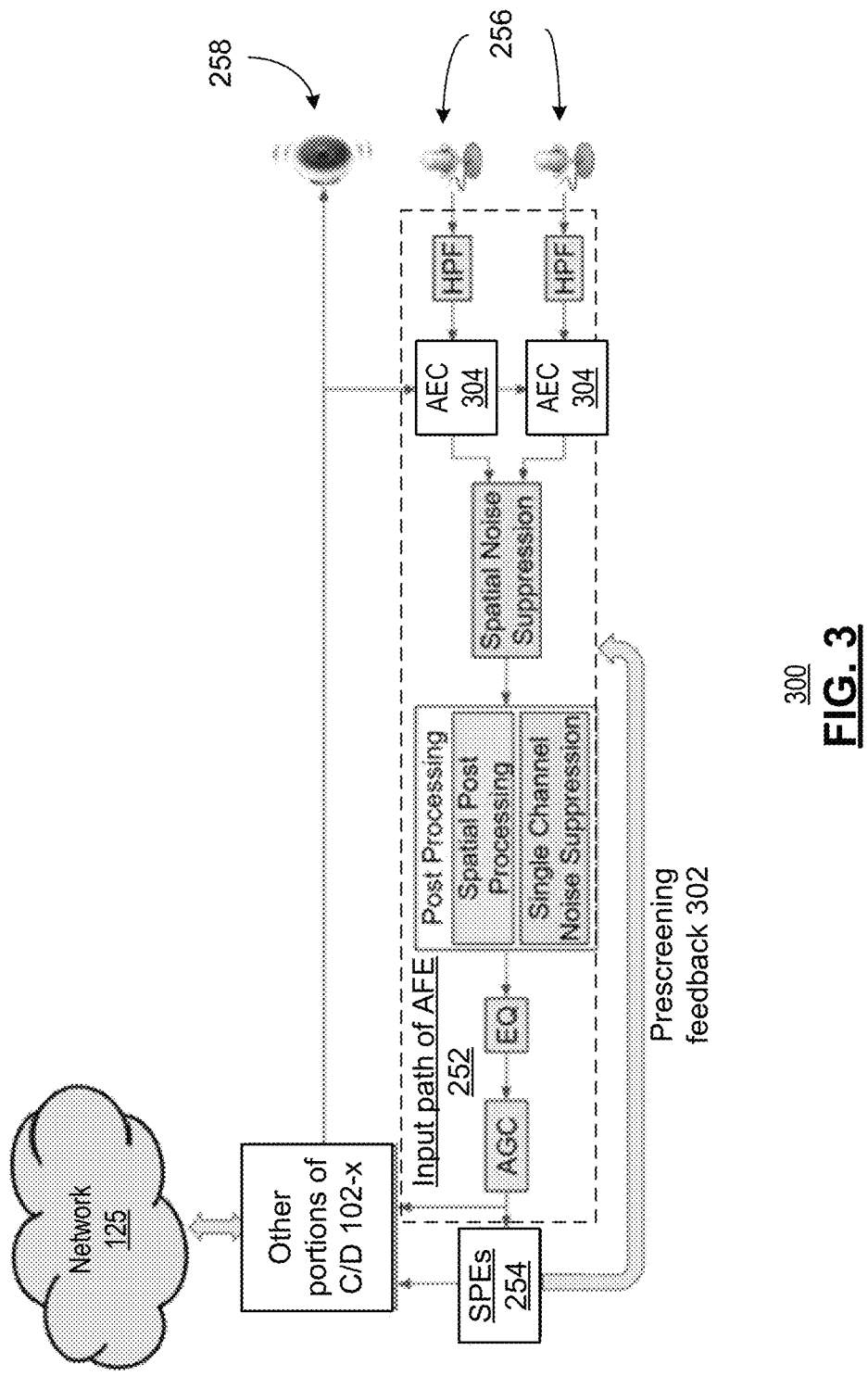
FIG. 3 is a pictorial block diagram illustrating an example of an input path of an audio front end in accordance with various aspects described herein.

FIG. 3 is a pictorial block diagram 300 illustrating an example of an input path of an audio front end in accordance with various aspects described herein. In the example shown, input from two microphones 256 is high-pass filtered (HPF), and passed to AEC circuits 304 that operate based on audio output signals to loudspeaker 258. The echo-cancelled signals are passed through noise suppression and post processing such as spatial post processing and single channel noise suppression, equalization (EQ), and an automatic gain control (AGC) before being presented to one or more special purpose engines (SPEs) 254 and to other portions of the client device 102-*x*.

Feedback from the one or more special purpose engines (SPEs) 254, such as prescreening feedback 302 can be used to adjust parameters of the audio front end. Consider the following AOV example where special purpose engines (SPEs) 254 include a low complexity wake-word model. This low complexity model can be a relaxed model that performs relaxed (less restrictive) pre-screening for candidate wake-words. This can be implemented as simply as feeding input from one microphone directly to a relaxed model. In addition to a low complexity implementation, this relaxed model, for example, can operate via a receiver operating curve (ROC) that is biased toward a higher false acceptance rate (FAR) and a lower false rejection rate (FRR).

When a candidate wake-word is detected by the relaxed model, information from pre-screening can be used as pre-screening feedback 302 to set up advanced dual-mic processing to "zoom" in on the associated direction of arrival (DOA) of the wake-word. This targeted (directed) audio can be passed through a more restrictive model implemented via either a second SPE 254 or an adjusted version of the SPE 254 that implements the more relaxed model. This more restrictive model can have a ROC that has a lower FAR and, for example, can be more evenly biased between FAR and FRR.

This dual solution can provide real-time low-complexity (relaxed) screening for candidate wake-word's, with higher complexity (less relaxed/more restrictive and possibly higher power and non-real-time) processing that operates to, for example, clean-up and verify the candidate wake-word
  provide more accurate query processing This configuration improves the technology of wake-word processing by very low power and simple pre-screening and potentially lower power and lower speed processing during the majority of AOV operation—allowing a DSP (or other circuitry) to run at higher duty cycle only during advanced clean-up and verification of the wake-word.

Figure 4:
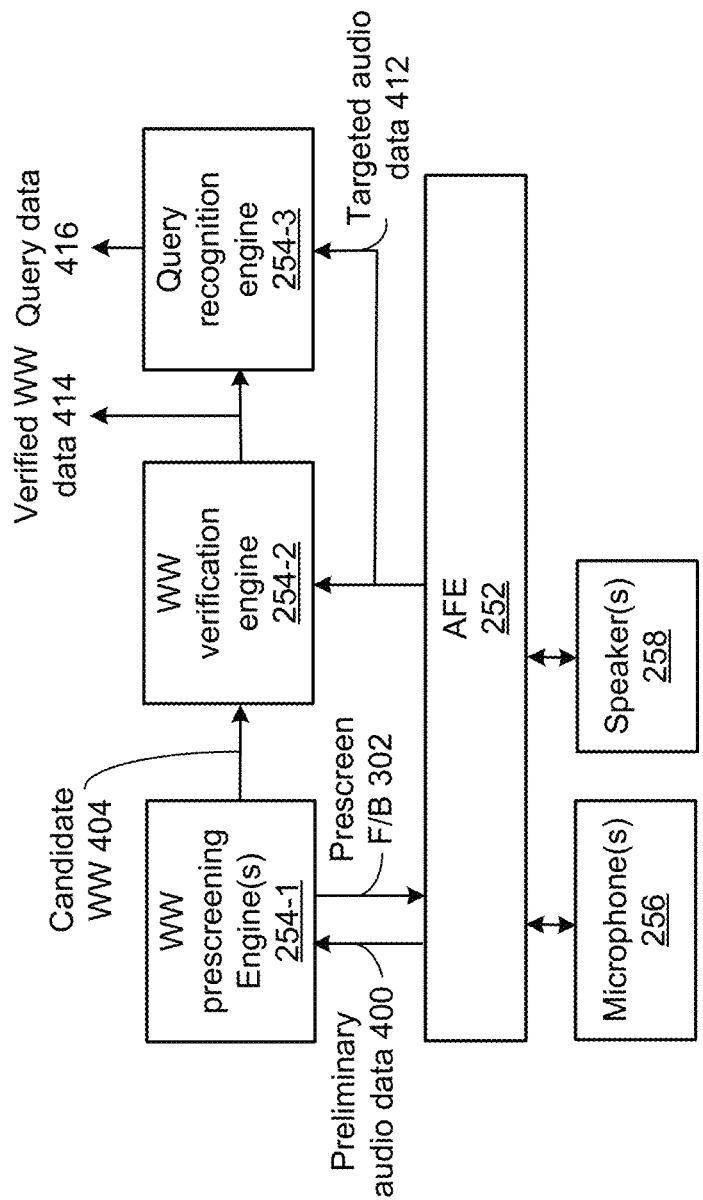
FIG. 4 is a block diagram illustrating example audio processing components of a client device in accordance with various aspects described herein.

FIG. 4 is a block diagram illustrating example audio processing components of a client device in accordance with various aspects described herein. In the example shown, preliminary audio data 400 (e.g., PCM data) is generated via an audio front end 252 coupled to one or more microphones 256. The wake-word (WW) prescreening engine or engines 254-1 operate to determine when the preliminary audio data 400 corresponds to a candidate wake-word. In response, the wake-word prescreening engine(s) 254-1 generates pre-screening feedback (FB) 302 and a candidate wake-word flag 404 that indicates the detection of a candidate wake-word. The AFE 252 responds to the prescreening feedback 302 by generating targeted audio data 412 that, for example, is processed to focus on the DOA of the candidate wake-word. It should be noted that, in various examples, the AFE 252 can include one or more buffers that store the incoming audio for later processing as targeted audio data 412. The wake-word verification engine 254-2 operates to determine when the targeted audio data 412 corresponds to a verified wake-word and generates verified wake-word data 414 in response thereto. The targeted audio data 412 can also be used by the query recognition engine 254-3 to generate query data 416 from the recognized source of the verified wake-word.

In various examples, an audio processing circuit includes an audio front end (AFE) 252 configured to generate preliminary audio data 400 in response to audio signals received from a plurality of microphones 256. One or more special purpose engines (SPEs) are configured to:
- determine when the preliminary audio data 400 corresponds to a candidate wake-word 404;
- generate prescreening feedback 302 to the AFE 252 in response to the candidate wake-word 404, wherein the AFE 252 generates, based on the prescreening feedback 302, targeted audio data 412; and
- determine when the targeted audio data 412 corresponds to a verified wake-word; and
- generate verified wake-word data 414 when the targeted audio data corresponds to a verified wake-word.

In addition or in alternative to any of the foregoing, the one or more SPEs include a plurality of direction of arrival processing circuits corresponding to a plurality of directions of arrival.

In addition or in alternative to any of the foregoing, plurality of direction of arrival processing circuits operate in a frequency domain.

In addition or in alternative to any of the foregoing, the one or more SPEs further includes a plurality of artificial intelligence (AI) models coupled to the plurality of direction of arrival processing circuits configured to determine when the preliminary audio data corresponds to a candidate wake-word and a most likely direction of arrival of the plurality of directions of arrival corresponding to the candidate wake-word.

In addition or in alternative to any of the foregoing, the plurality of AI models includes a plurality of virtual neural networks.

In addition or in alternative to any of the foregoing, the prescreening feedback indicates the most likely direction of arrival corresponding to the candidate wake-word.

In addition or in alternative to any of the foregoing, the targeted audio data is generated in accordance with the most likely direction of arrival corresponding to the candidate wake-word.

In addition or in alternative to any of the foregoing, the one or more SPEs include a wake-word engine configured to generate verified wake-word data when the targeted audio data corresponds to the verified wake-word In addition or in alternative to any of the foregoing, the wake-word engine operates via an artificial intelligence (AI) model.

In addition or in alternative to any of the foregoing, the one or more SPEs further includes a a query recognition engine that generates query data based on the targeted audio data after recognition of the verified wake-word.

Figure 5:
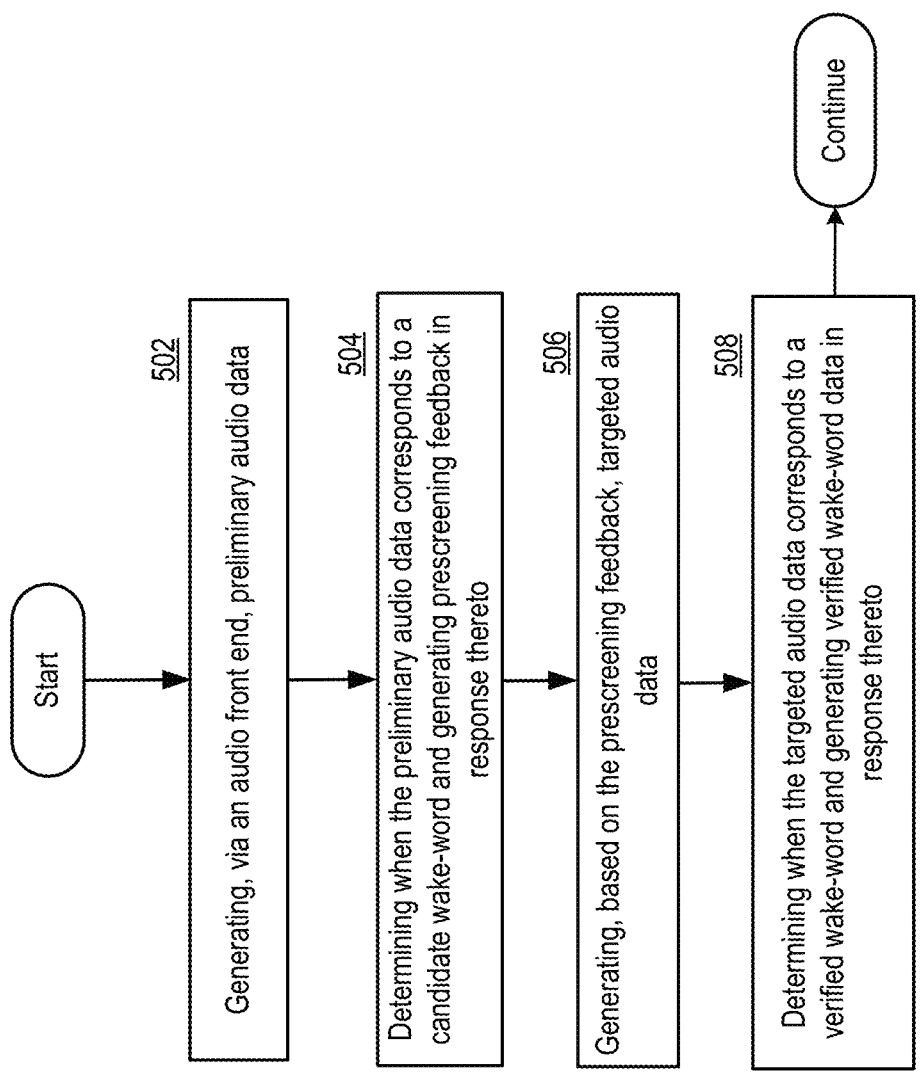
FIG. 5 illustrates a flow diagram of an example method in accordance with various aspects described herein.

FIG. 5 illustrates a flow diagram of an example method in accordance with various aspects described herein. In particular, a method 500 is presented for use with one or more functions and features presented in this disclosure. Step 502 includes generating, via an audio front end, preliminary audio data. Step 504 includes determining, when the preliminary audio data corresponds to a candidate wake-word and generating prescreening feedback in response thereto.

Step 506 includes generating, based on the prescreening feedback, targeted audio data. Step 508 includes determining when the targeted audio data corresponds to a verified wake-word and generating verified wake-word data in response thereto.

In addition or in alternative to any of the foregoing, one or more special purpose engines (SPEs) are configured to perform steps (b) and (d) and wherein step (c) is performed by the AFE.

In addition or in alternative to any of the foregoing, the one or more SPEs include a plurality of direction of arrival processing circuits corresponding to a plurality of directions of arrival.

In addition or in alternative to any of the foregoing, the plurality of direction of arrival processing circuits operate in a frequency domain.

In addition or in alternative to any of the foregoing, the one or more SPEs further includes a plurality of artificial intelligence (AI) models coupled to the plurality of direction of arrival processing circuits configured to determine when the preliminary audio data corresponds to a candidate wake-word and a most likely direction of arrival of the plurality of directions of arrival corresponding to the candidate wake-word.

In addition or in alternative to any of the foregoing, the prescreening feedback indicates the most likely direction of arrival corresponding to the candidate wake-word.

In addition or in alternative to any of the foregoing, the targeted audio data is generated in accordance with the most likely direction of arrival corresponding to the candidate wake-word.

In addition or in alternative to any of the foregoing, the one or more SPEs include a wake-word engine configured to generate verified wake-word data when the targeted audio data corresponds to the verified wake-word In addition or in alternative to any of the foregoing, the method further includes generating query data based on the targeted audio data after recognition of the verified wake-word.

Figure 6:
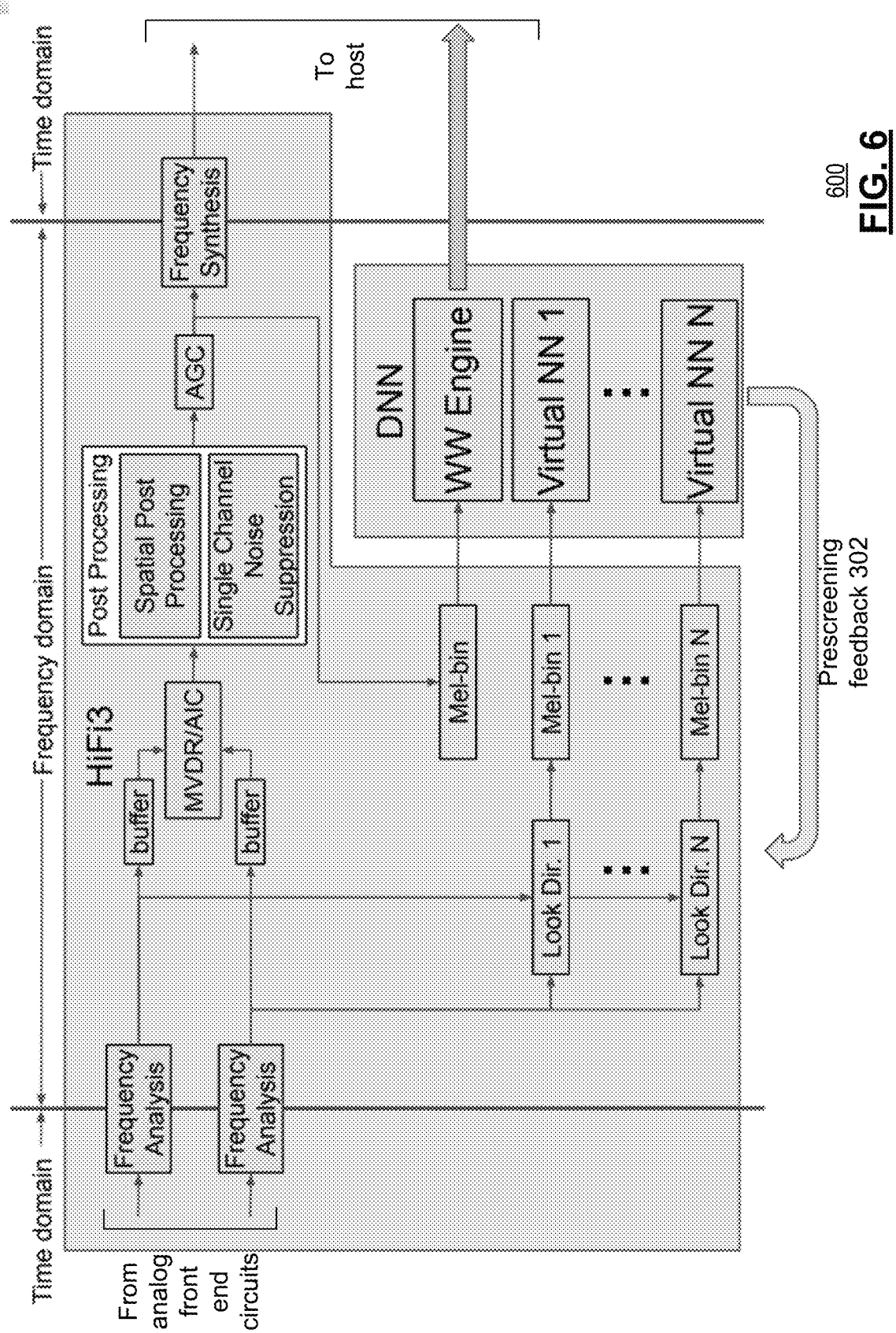
FIG. 6 is a block diagram illustrating example audio processing components of a client device in accordance with various aspects described herein.

FIG. 6 is a block diagram 600 illustrating example audio processing components of a client device in accordance with various aspects described herein. A further example is presented that includes multiple WW prescreening engines in the form of a set of N virtual neural networks (Virtual NN 1-Virtual NN N), each corresponding to one of N different "look" directions of the audio. This configuration allows the system to look in multiple directions continuously with "simple" spatial processing, pre-screening for candidate wake-word's, using multiple instances of a low power relaxed (small) model. When a candidate wake-word is detected, the system can select the highest probability direction among directions with activation. In this example, little or no rewind to the beginning of wake-word is required and, consequently, only a relatively short buffer is required. The system can then process the audio data with a more advanced algorithm (shown as WW Engine), with or without rewind, and leveraging the determined look direction. The more advanced algorithm can verify activation via the more restrictive model. If detection of the wake-word is confirmed, the advanced algorithm can also be applied to the query portion of the processing.

This configuration improves the technology of wake-word detection by increasing detection accuracy, not requiring the buffering of long segments of audio (e.g., smaller buffers, less memory, lower latency, lower processing speeds), and by facilitating real-time processing (e.g., without requiring a combination of real-time and off-line processing).

In various embodiments, the AFE operates via a 512-point fast Fourier transform (FFT) and a sample block size of 256. The Mel-bin extraction can use a 512-point FFT and 384 sample window step. Significant simplification can occur by matching the NN window step to the AFE block size. The AGC can be implemented in the time domain or frequency domain.

Figure 7:
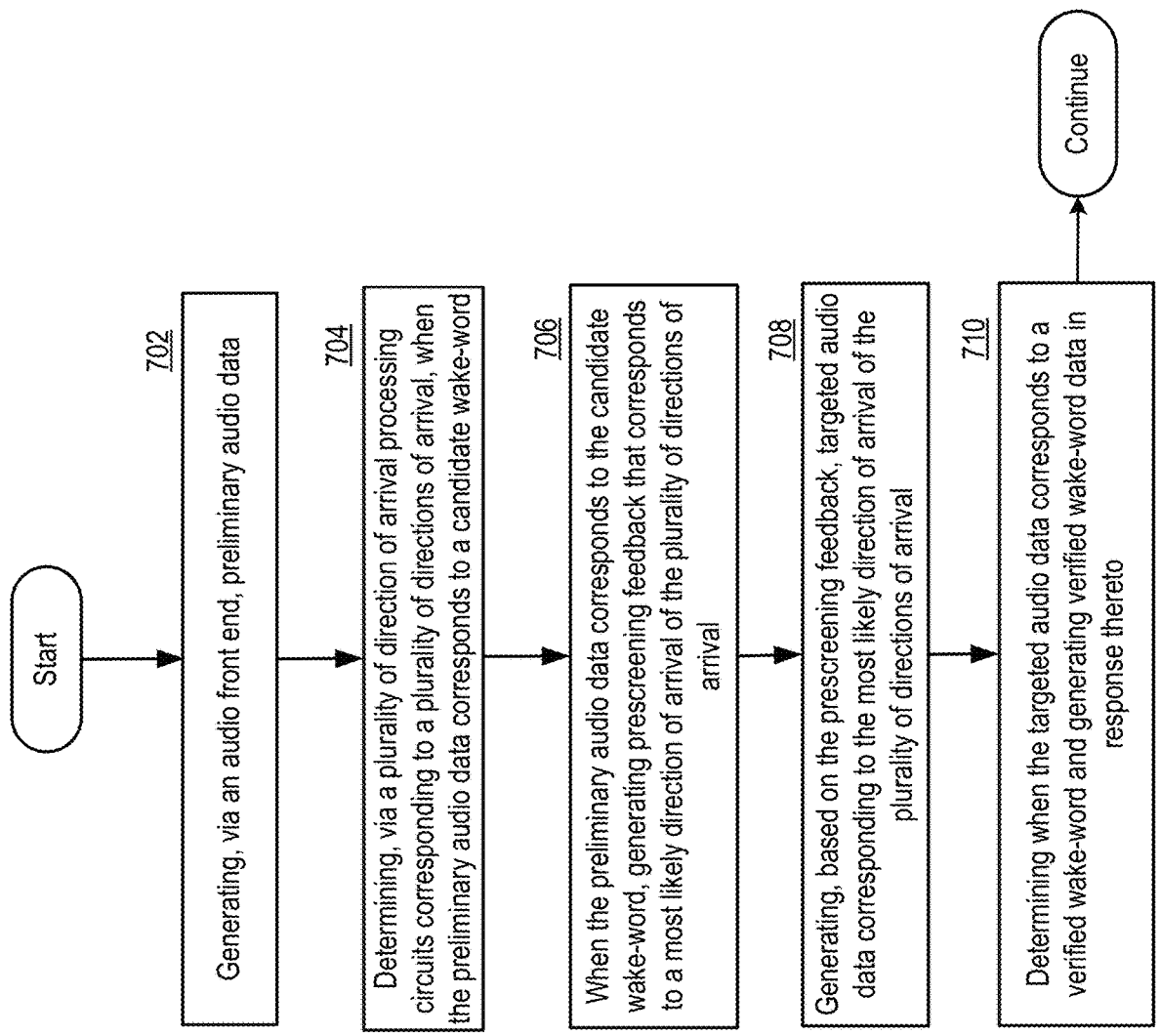
FIG. 7 illustrates a flow diagram of an example method in accordance with various aspects described herein.

FIG. 7 illustrates a flow diagram of an example method in accordance with various aspects described herein. In particular, a method 700 is presented for use with one or more functions and features presented in this disclosure. Step 702 includes generating, via an audio front end, preliminary audio data. Step 704 includes determining, via a plurality of direction of arrival processing circuits corresponding to a plurality of directions of arrival, when the preliminary audio data corresponds to a candidate wake-word. Step 706 includes, when the preliminary audio data corresponds to the candidate wake-word, generating prescreening feedback that corresponds to a most likely direction of arrival of the plurality of directions of arrival.

Step 708 includes generating, based on the prescreening feedback, targeted audio data corresponding to the most likely direction of arrival of the plurality of directions of arrival. Step 710 includes determining when the targeted audio data corresponds to a verified wake-word and generating verified wake-word data in response thereto.

Figure 8:
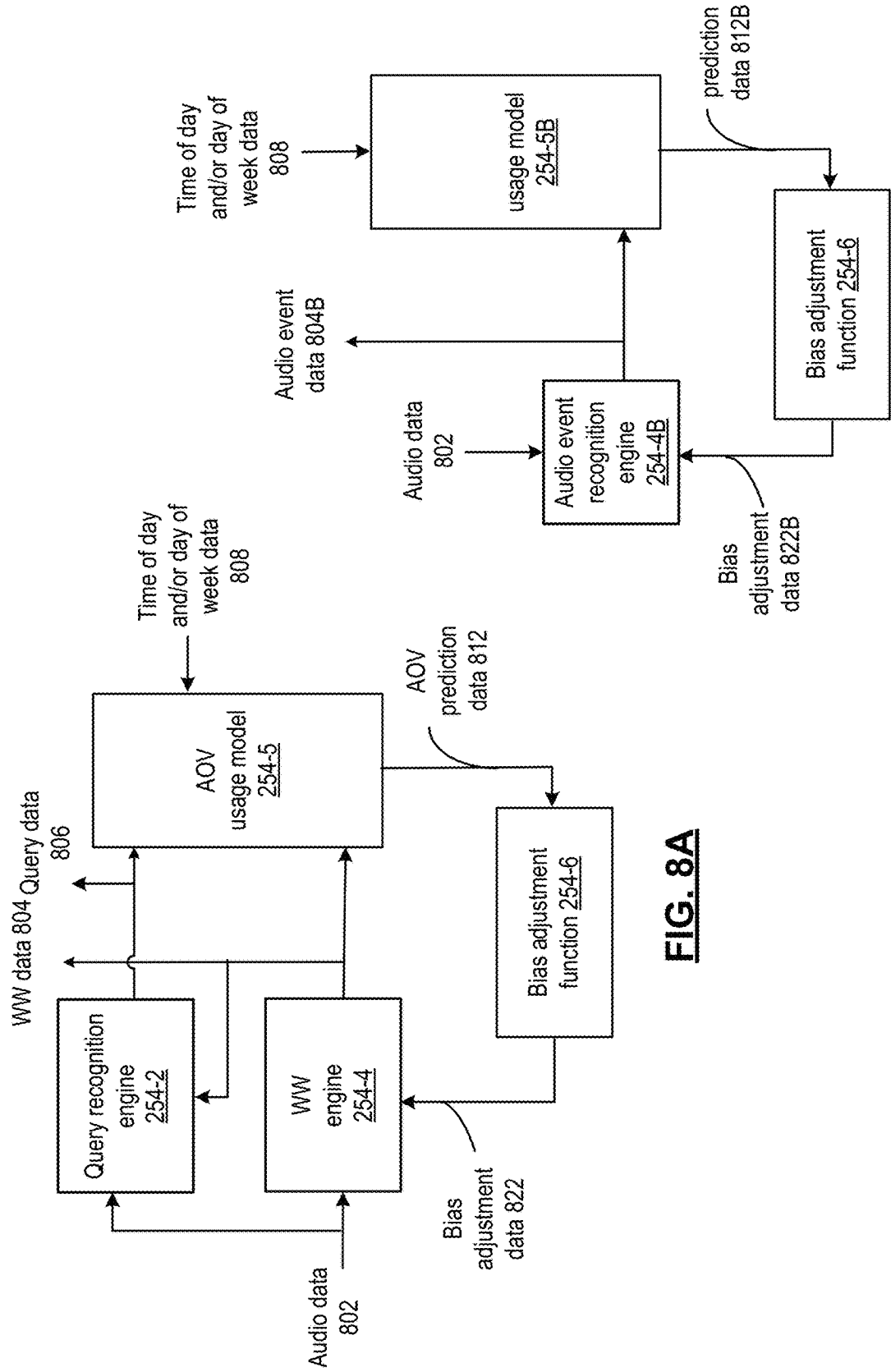
FIG. 8A is a block diagram illustrating example audio processing components of a client device in accordance with various aspects described herein.
FIG. 8B is a block diagram illustrating example audio processing components of a client device in accordance with various aspects described herein.

FIG. 8A is a block diagram illustrating example audio processing components of a client device in accordance with various aspects described herein. As previously discussed, FRR and FAR are considerations used in implementing wake-word detection models for AOV systems. For example, models can be anchored by two sets of posterior parameters, only differing in threshold, an FAR biased threshold; and
an FRR biased threshold.

Typical systems seek an appropriate compromise between false acceptance and false rejection errors.

Consider further that usage of AOV systems can be characterized generally by periods of AOV usage, and periods of time with little or no AOV usage. AOV usage can be considered a stochastic process with memory that can be modeled and used to predict periods of use and non-use, high use, low use and medium use, or any usage rate in between based on a priori probabilities of usage. In particular, a priori AOV usage probabilities can be estimated/predicted from a preceding history of activations via stochastic models, pattern recognition or other artificial intelligence.

Predictions/estimates of current AOV usage that are based on these a priori probabilities can be used to improve the accuracy of wake-word models by biasing thresholds towards higher FAR (models with more relaxed acceptance) or higher FRR (more restricted acceptance) between FAR and FFR anchor points. For robustness, each anchor point can be selected to perform reasonably well on its own in both FAR and FRR. In periods where the predicted AOV usage probability is high, when for example, there was significant AOV usage recently, AOV usage patterns indicate that the current time or day and/or day of week indicate that AOV usage is more likely than normal and/or current AOV usage matches a historical pattern of high AOV usage, etc., then the wake-word model(s) can be biased towards higher FAR (higher acceptance—lower rejection). In periods where the AOV usage predicted probability is low, when for example, in a period without AOV usage, AOV usage patterns indicate that the current time or day and/or day of week indicate that AOV usage is less likely than normal and/or current AOV usage matches a historical pattern of low AOV usage, etc., then the wake-word model(s) can be biased towards higher FRR (higher rejection—lower acceptance). Further, in periods where the predicted AOV usage probability is neither high or low (e.g., midrange or normal) a more balanced FAR/FRR bias can be applied.

In various examples, an audio processing circuit includes an audio front end (AFE) configured to generate audio data in response to audio signals received from one or more microphones and one or more special purpose engines (SPEs) configured to:

generate always-on voice (AOV) prediction data via an AOV usage model;

generate bias adjustment data based on the AOV prediction data;

adjust a wake-word threshold of a wake-word engine based on the AOV prediction data; and determine, via the wake-word engine and based on audio data, when a wake-word is detected.

In addition or in alternative to any of the foregoing, the AOV usage model is generated based on a historical data of AOV usage.

In addition or in alternative to any of the foregoing, the historical data of AOV usage is based on times of wake-word detections.

In addition or in alternative to any of the foregoing, the one or more SPEs further includes a query recognition engine that generates recognized query data based on the targeted audio data after the wake-word is detected.

In addition or in alternative to any of the foregoing, the historical data of AOV usage is further based on the recognized query data.

In addition or in alternative to any of the foregoing, the wake-words are only considered in the historical data of AOV when followed by the recognized query data.

In addition or in alternative to any of the foregoing, the wake-word engine includes a model anchored by two sets of posterior parameters, only differing in threshold.

In addition or in alternative to any of the foregoing, the two sets of posterior parameters include a false acceptance rate (FAR) biased threshold and a false rejection rate (FRR) biased threshold.

In addition or in alternative to any of the foregoing, the wake-word threshold of the wake-word engine is adjusted between the FAR biased threshold and the FRR biased threshold.

In addition or in alternative to any of the foregoing, the wake-word threshold of the wake-word engine is adjusted, based on the AOV prediction data, to match current estimated AOV usage conditions.

Consider the system shown. Audio data 802 is processed by the wake-word engine 254-4. When a wake-word is detected, wake-work data 804 is sent to the query recognition engine 254-2 which responds by recognizing query data 416. Historical data of AOV usage, can be characterized based on times of wake-word detections, query data recognition and/or other speech detection associated with wake-words and queries and/or time of day and day of the week data 808 and used to generate an AOV usage model 254-5. In various examples, wake-word detections are only considered when followed by query data recognition, valid responses and or other recognized speech indicative of actual, rather than unintended usage of the AOV system. The AOV usage model 254-5 generates AOV prediction data, for example, predicted AOV probabilities 812 for the current time. A bias adjustment function 254-6 generates bias adjustment data 822, such as adjusted model bias thresholds, based on the AOV prediction data 812. The wake-word threshold of the wake-word engine 254-4 can then be adjusted based on the AOV prediction data, to match the current (estimated) AOV usage conditions. Based on these adjustments, the wake-word engine 254-4 continues to operate to determine when a wake-word is detected, based on the audio data 802.

FIG. 8A is a block diagram illustrating example audio processing components of a client device in accordance with various aspects described herein. In particular, portions of a device are shown that is capable of, more broadly, detecting audio events and generating audio event data 804B in response to such detections, via a audio event recognition engine 254-4B that has a threshold that is adjusted via bias adjustment data 822B.

Consider further that usage of some audio event recognition systems can be characterized generally by periods of usage, and periods of time with little or no usage. The usage of a such as system can also be considered a stochastic process with memory that can be modeled and used to predict periods of use and non-use, high use, low use and medium use, or any usage rate in between based on a priori probabilities of usage. In particular, a priori usage probabilities can be estimated/predicted from a preceding history of activations via stochastic models, pattern recognition or other artificial intelligence.

Predictions/estimates of current usage that are based on these a priori probabilities can be used to improve the accuracy of audio event recognition engines by biasing thresholds towards higher FAR (models with more relaxed acceptance) or higher FRR (more restricted acceptance) between FAR and FFR anchor points. For robustness, each anchor point can be selected to perform reasonably well on its own in both FAR and FRR. In periods where the predicted usage probability is high, when for example, there was significant usage recently, usage patterns indicate that the current time or day and/or day of week indicate that usage is more likely than normal and/or current usage matches a historical pattern of high usage, etc., then the wake-word model(s) can be biased towards higher FAR (higher acceptance—lower rejection). In periods where the usage predicted probability is low, when for example, in a period without usage, usage patterns indicate that the current time or day and/or day of week indicate that usage is less likely than normal and/or current usage matches a historical pattern of low usage, etc., then the wake-word model(s) can be biased towards higher FRR (higher rejection—lower acceptance). Further, in periods where the predicted usage probability is neither high or low (e.g., midrange or normal) a more balanced FAR/FRR bias can be applied.

In various examples, an audio processing circuit includes an audio front end (AFE) configured to generate audio data in response to audio signals received from one or more microphones and one or more special purpose engines (SPEs) configured to:
generate prediction data 812B via a usage model 254-5B;
generate bias adjustment data 822B based on the prediction data 812B;
adjust a threshold of an audio event recognition engine 254-4B based on the prediction data; and
determine, via the audio event recognition engine 254-4B and based on audio data, when an audio event is detected.

In addition or in alternative to any of the foregoing, the prediction data includes always-on voice (AOV) prediction data.

In addition or in alternative to any of the foregoing, the usage model is an AOV usage model generated based on historical data of AOV usage.

In addition or in alternative to any of the foregoing, the audio event recognition engine is a wake-word engine.

In addition or in alternative to any of the foregoing, the threshold is a wake-word threshold.

In addition or in alternative to any of the foregoing, the audio event corresponds to detection of a wake-word.

It should be noted that, while AOV usage model 254-5 and bias adjustment function 254-6 are shown as two separate elements, the functionality of both devices could be combined into a single model that directly provides bias adjustment data 822 that is based on current usage, historical patterns, current time and date and/or other methods of prediction and that, for example, is adjusted to reflect the current level of likelihood of AOV usage.

Figure 9:
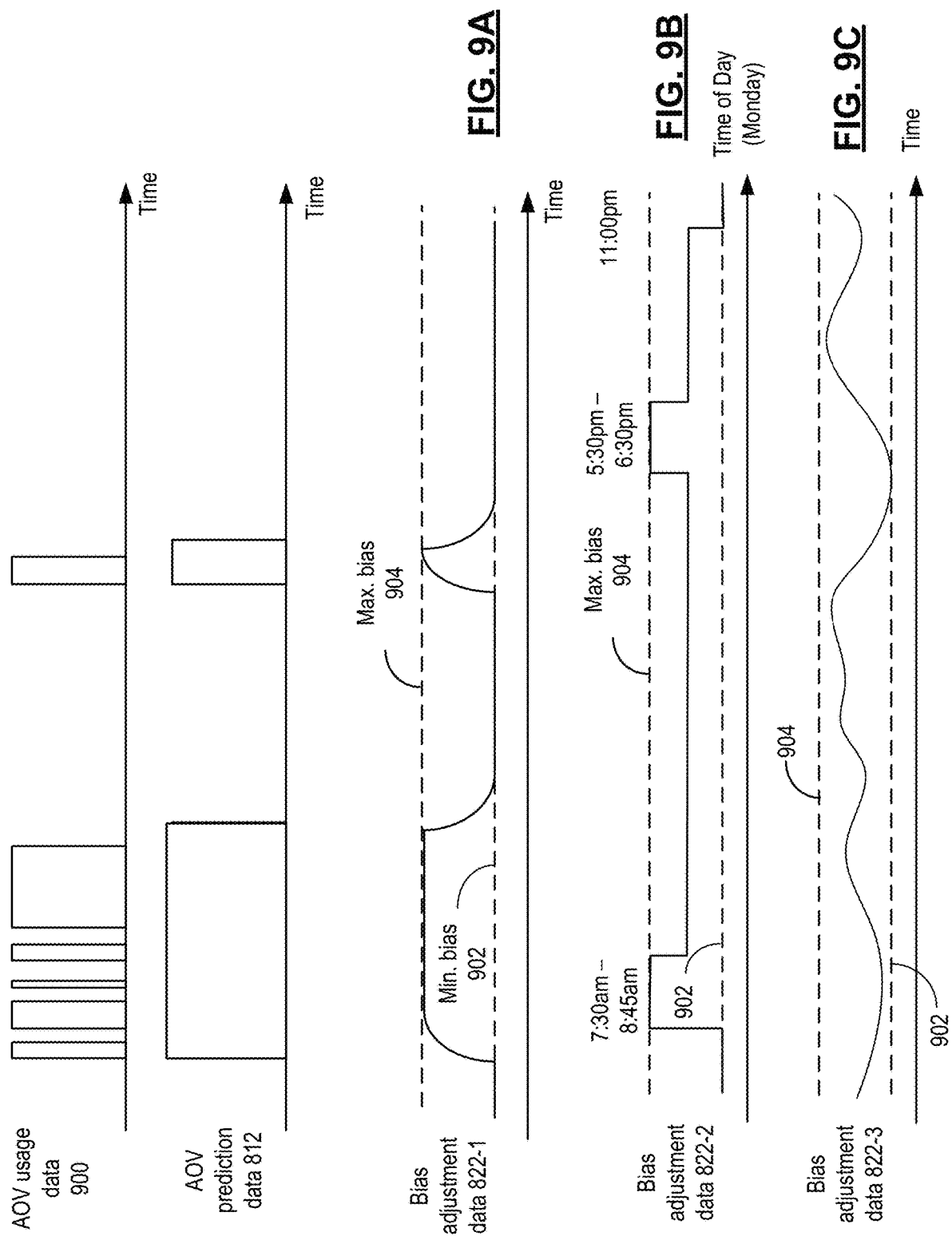
FIGS. 9A-9C are example timing diagrams in accordance with various aspects described herein.

FIGS. 9A-9C are example timing diagrams in accordance with various aspects described herein. Turning first to FIG. 9A, current AOV usage data 900 is shown that illustrates two extended periods of detected wake-words, queries and/or other recognized speech. Once each AOV usage prediction period begins, AOV usage is predicted with high probability until a predetermined period of non-usage expires. This probability data 812 is used to generate the bias adjustment data 822-1 via an exponential weighted moving average, a low pass filter or other processing between minimum bias 902 (low acceptance) and maximum bias 904 (high acceptance).

While the example of FIG. 9A predicted current AOV usage probabilities and adjusted model bias based on usage in the short-term past (e.g. within some predetermined period of time of current conditions), other implementations are likewise possible. An alternative example is shown in FIG. 9B. In this case, historical AOV usage data for the user has been used to learn that the user's typical Monday usage is low between 11 PM and 7:30 am, high between 7:30-8:45 am and 5:30-6:30 μm, and moderate between those times. The bias adjustment data 822-2 has been generated, for example, based on histograms of daily usage data accumulated over several weeks or longer periods of usage to reflect these past trends and to tune the wake-word model to the predicted usage patterns of the user. While the above description has focused on modeling based on a single user, usage patterns gathered over a population of multiple users can be used as a default usage model that is refined over time based on usage data from the particular user of the client device 102-*x*.

Furthermore, while the bias adjustment data 822-2 of FIG. 9B is shown as being a discrete function of time, continuous functions can likewise be employed as shown in FIG. 9C. In this case, the bias adjustment data 822-3 is generated based on the best fit to current and/or historical usage patterns.

Figure 10:
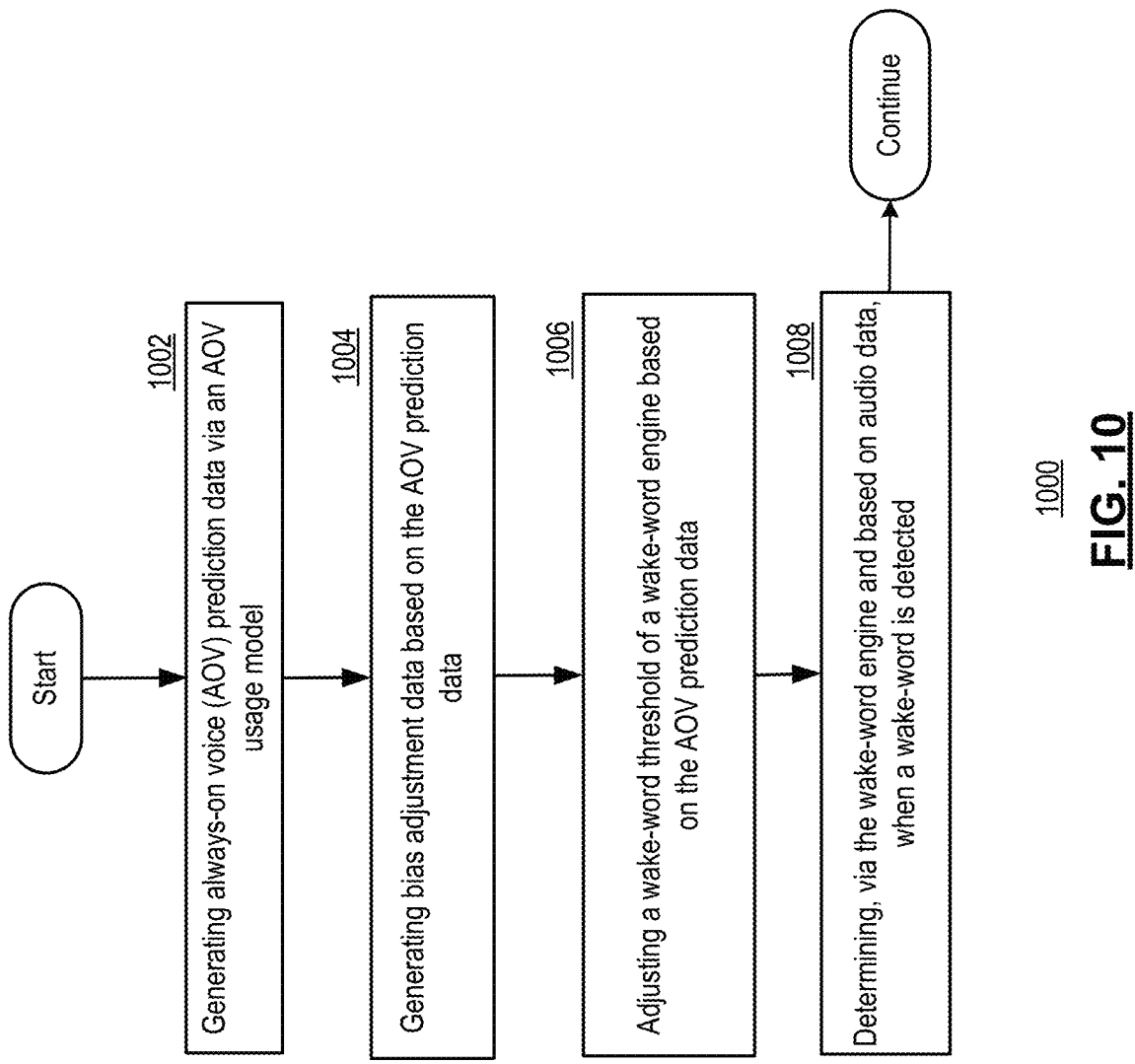
FIG. 10 illustrates a flow diagram of an example method in accordance with various aspects described herein.

FIG. 10 illustrates a flow diagram of an example method in accordance with various aspects described herein. In particular, a method 1000 is presented for use with one or more functions and features presented in this disclosure. Step 1002 includes generating always-on voice (AOV) prediction data via an AOV usage model. Step 1004 includes generating bias adjustment data based on the AOV prediction data. Step 1006 includes adjusting a wake-word threshold of a wake-word engine based on the AOV prediction data. Step 1008 includes determining, via the wake-word engine and based on audio data, when a wake-word is detected.

In addition or in alternative to any of the foregoing, the AOV usage model is generated based on a historical data of AOV usage.

In addition or in alternative to any of the foregoing, the historical data of AOV usage is based on times of wake-word detections.

In addition or in alternative to any of the foregoing, the method further includes generating recognized query data based on the targeted audio data after the wake-word is detected.

In addition or in alternative to any of the foregoing, the historical data of AOV usage is further based on the recognized query data.

In addition or in alternative to any of the foregoing, the wake-words are only considered in the historical data of AOV when followed by the recognized query data.

In addition or in alternative to any of the foregoing, the wake-word engine includes a model anchored by two sets of posterior parameters, only differing in threshold.

In addition or in alternative to any of the foregoing, the two sets of posterior parameters include a false acceptance rate (FAR) biased threshold and a false rejection rate (FRR) biased threshold.

In addition or in alternative to any of the foregoing, the wake-word threshold of the wake-word engine is adjusted between the FAR biased threshold and the FRR biased threshold.

In addition or in alternative to any of the foregoing, the wake-word threshold of the wake-word engine is adjusted, based on the AOV prediction data, to match current estimated AOV usage conditions.

Figure 11:
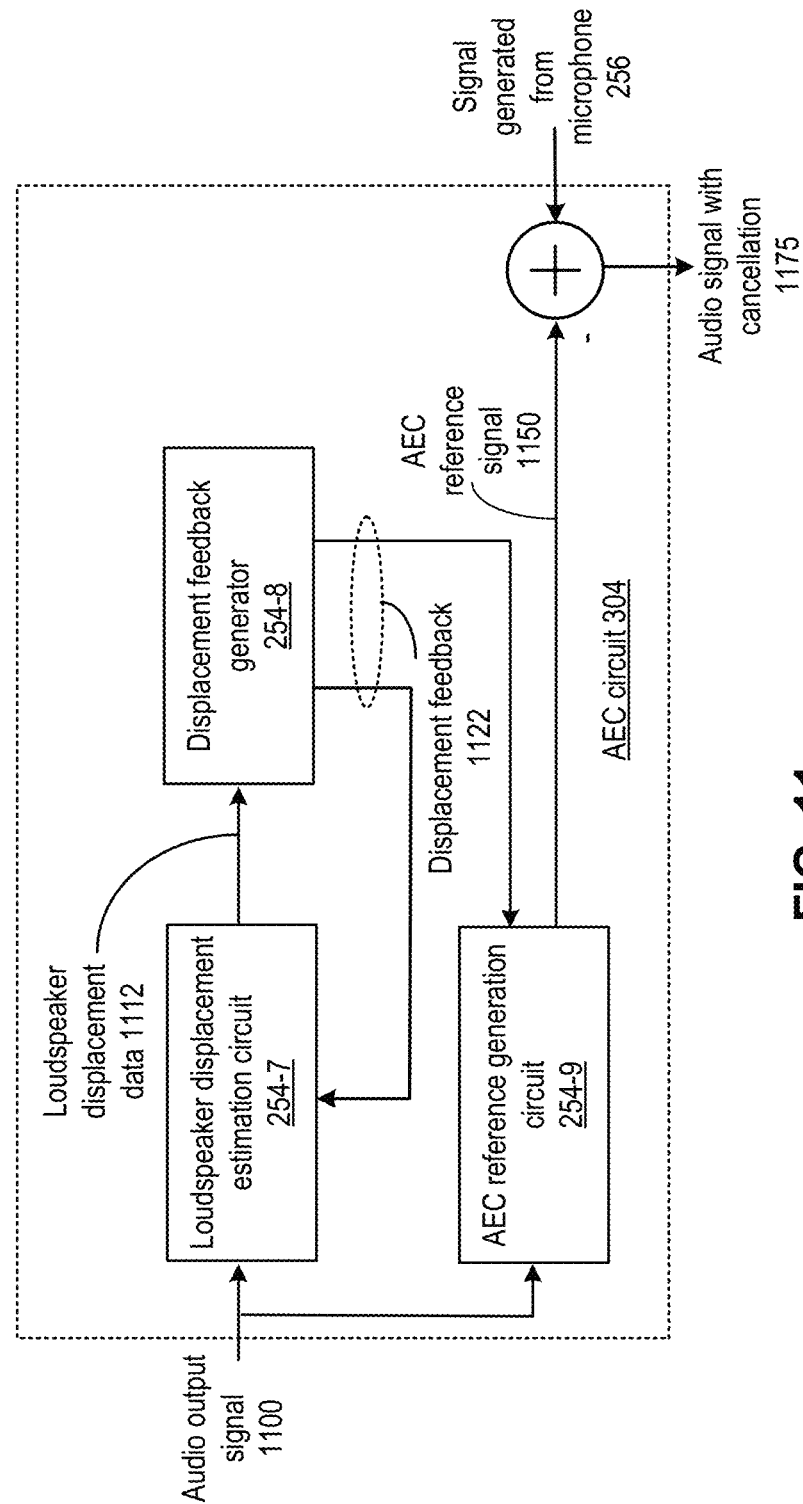
FIG. 11 is a block diagram illustrating an example of an audio echo cancellation circuit in accordance with various aspects described herein.

FIG. 11 is a block diagram illustrating an example of an audio echo cancellation circuit in accordance with various aspects described herein. In particular, an audio echo cancellation (AEC) circuit 304 is shown. AEC circuit 304 operates based on an audio output signal 1100, such as a far end signal that is amplified and played through a loudspeaker 358. At the client device, a microphone 256 generates a signal from both the sound from the loudspeaker (echo) and sounds from the near end. The AEC circuit 304 generates an AEC reference signal 1150 that emulates the far end echo. The negative of this signal is summed with the signal from the microphone 256 to generate the audio signal with cancellation 1175—having the effects of the far end removed and leaving the near end microphone signal untouched.

Traditional AEC methodologies rely on linear filters to emulate far end signals. The issue with these traditional approaches is that loudspeakers are not perfectly linear. In fact, when played loudly, the sound from the loudspeaker can actually be dominated by nonlinear components—particularly in client devices employing very small loudspeakers. These nonlinear components will leak through no matter how well the linear filter is designed. Prior systems have attempted to address this issue via a separate microphone pick-up that senses the actual loudspeaker output. This approach requires an additional sensor and additional cost. Other systems have attempted to model the nonlinearities via a Volterra series expansion. Given the complexity of these non-linear distributed parameter models, they are difficult to implement accurately in real-time with reasonable amounts of processing.

The AEC 304 operates, instead, to generate an AEC reference signal 1150 utilizing a displacement-based mathematical model that represents the true output of the loudspeaker—nonlinearities included. In this way, the AEC 304 can remove essentially all the leakage from the nonlinear loudspeaker output.

In various example, the audio echo cancellation circuit 304 includes an audio echo cancellation (AEC) reference generation circuit 254-9 configured to generate an AEC reference signal 1150 in response to an audio output signal 1100. A loudspeaker displacement estimation circuit 254-7 is configured to generate loudspeaker displacement data 1112 in response to the audio output signal 1100. A displacement feedback generator 254-8 is configured to generate displacement feedback 1122 in response to the loudspeaker displacement data, wherein the AEC reference generation circuit 254-9 is adjusted based a first portion of the displacement feedback 1122 and wherein the loudspeaker displacement estimation circuit 254-7 is adjusted based a second portion of the displacement feedback 1122.

In addition or in alternative to any of the foregoing, an audio signal with cancellation is generated by subtracting the AEC reference signal from a microphone signal.

In addition or in alternative to any of the foregoing, the audio echo cancellation (AEC) reference generation circuit includes a first linear filter that operates based on a first set of coefficients.

In addition or in alternative to any of the foregoing, the first portion of the displacement feedback corresponds to the first set of coefficients.

In addition or in alternative to any of the foregoing, the loudspeaker displacement estimation circuit includes a linear filter that operates based on a second set of coefficients.

In addition or in alternative to any of the foregoing, the second portion of the displacement feedback corresponds to the second set of coefficients.

In addition or in alternative to any of the foregoing, the displacement feedback generator includes a filter coefficient generator that generates the first set of coefficients and the second set of coefficients based on a calculated loudspeaker displacement indicated by the loudspeaker displacement data.

In addition or in alternative to any of the foregoing, the displacement feedback generator further includes a non-linear lumped parameter model as a function of the calculated loudspeaker displacement indicated by the loudspeaker displacement data and wherein the filter coefficient generator generates the first set of coefficients and the second set of coefficients further based on based on the non-linear lumped parameter model.

In addition or in alternative to any of the foregoing, the non-linear lumped parameter model generates values of a spring constant and a force factor as the function of the calculated loudspeaker displacement.

In addition or in alternative to any of the foregoing, the calculated loudspeaker displacement corresponds to a displacement of a loudspeaker voice coil.

Consider the following equation:

$$BL(x)*\text{current} = Mms*a + Rms*u + K(x)*x$$

where x represents displacement of the voice coil, u represents velocity and a represents acceleration, Mms is the moving mass of the loudspeaker, Rms is the mechanical resistance, and K(x) is the spring constant, BL(x) is the force factor, and "current" is the current of the audio output signal 1100. As shown in the non-linear lumped parameter model above, the BL(x) and K(x) are themselves functions of displacement. The loudspeaker performance can therefore be modeled by determining, for a particular loudspeaker design, the values of BL(x) and K(x) as a function of displacement. The reference signal for cancellation can then be emulated by:
1. Determining the current displacement for the nth sample of the current, $x_n$;
2. Determining the values of $BL(x_n)$ and $K(x_n)$; and
3. Calculating the reference signal for the nth sample as the loudspeaker output.

It should be noted that after step 2, $BL(x_n)$ and $K(x_n)$ become constants and step 3 can be reduced to a linear calculations—until the displacement is updated (e.g., $x_{n+1}$) and the process is repeated.

The AEC circuit 304 in FIG. 11 operates as follows. The loudspeaker displacement estimation circuit 254-7 generates loudspeaker displacement data in response to the audio output signal 1100. The displacement feedback generator 254-8 generates displacement feedback 1122 in response to the loudspeaker displacement data 1112.

The AEC reference generation circuit 254-9 is adjusted based a first portion of the displacement feedback 1122. The loudspeaker displacement estimation circuit 254-9 is adjusted based a second portion of the displacement feedback 1112. The AEC reference generation circuit 254-9 generates an AEC reference signal 1150 in response to an audio output signal 1100. The audio signal with cancellation 1175 is generated by subtracting the AEC reference signal 1150 from the signal generated from microphone 256.

Figure 12:
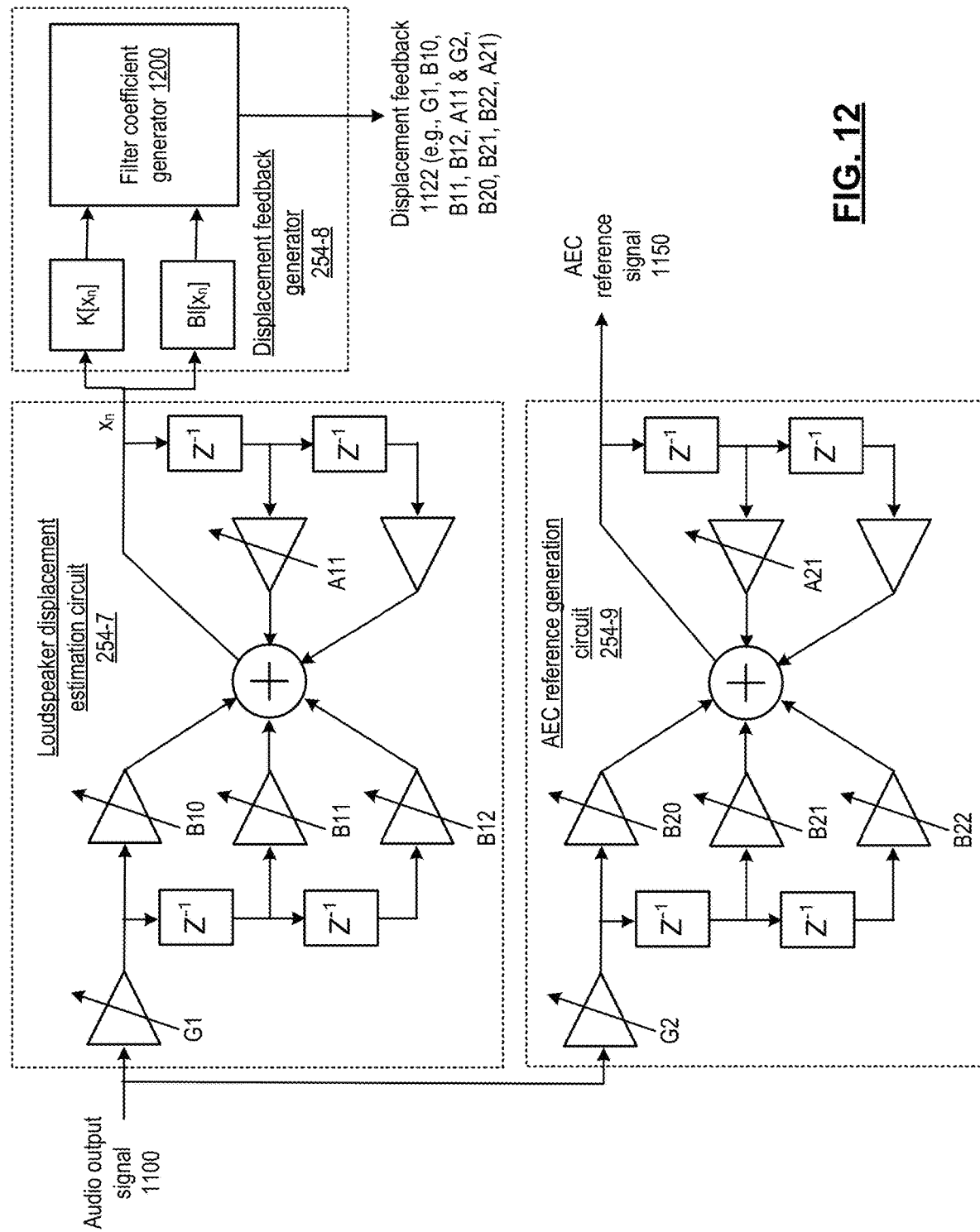
FIG. 12 is a schematic block diagram illustrating components of an example of an audio echo cancellation circuit in accordance with various aspects described herein.

FIG. 12 is a schematic block diagram illustrating an example of an audio echo cancellation circuit in accordance with various aspects described herein. An example of loudspeaker displacement estimation circuit 254-7, displacement feedback generator 254-8 and AEC reference generation circuit 254-9 is shown. In particular, loudspeaker displacement estimation circuit 254-7 is implemented via a second order linear filter having adjustable coefficients, G1, B10, B11, B12 and A11. AEC reference generation circuit 254-9 is implemented via a second order linear filter having adjustable coefficients, G2, B20, B21, B22 and A21. The displacement feedback generator 254-8 generates these coefficients based as a function of the calculated displacement $x_n$ based on both $BL(x_n)$ and $K(x_n)$. In various examples, the displacement feedback generator 254-8 includes a look-up table or other function generator that generates the coefficients G1, B10, B11, B12, A11, G2, B20, B21, B22 and A21 as a function of the current displacement $x_n$.

It can be observed that $BL(x_n)$ only affects the gains G1 and G2, while the other coefficients are influenced by $K(x_n)$. It should be noted that the AEC reference generation circuit 254-9 emulates the acceleration of the voice coil which is proportional to the loudspeaker output—however, in other simpler implementations, the output of the displacement feedback generator 254-8 can be used as the AEC reference signal 1150 and the AEC reference generation circuit 254-9 can be omitted.

Furthermore, while a particular non-linear model of a loudspeaker has been implemented above, the systems of FIGS. 11 and 12 could be modified to use a different model based on voice coil inductance instead of voice coil displacement. In addition, higher order filters and other filter configurations could likewise be used as well as other loudspeaker models corresponding, for example, to a ported system or a passive radiator loudspeaker design.

FIG. 13 illustrates a flow diagram of an example method in accordance with various aspects described herein. In particular, a method 1300 is presented for use with one or more functions and features presented in this disclosure.

Step 1302 includes generating, via an audio echo cancellation (AEC) reference generation circuit and in response to an audio output signal, an AEC reference signal. Step 1304 includes generating, via a loudspeaker displacement estimation circuit and in response to the audio output signal, loudspeaker displacement data. Step 1306 includes generating, via a displacement feedback generator and in response to the loudspeaker displacement data, displacement feedback. Step 1308 includes adjusting the AEC reference generation circuit based a first portion of the displacement feedback. Step 1310 includes adjusting the loudspeaker displacement estimation circuit based a second portion of the displacement feedback.

In addition or in alternative to any of the foregoing, an audio signal with cancellation is generated by subtracting the AEC reference signal from a microphone signal.

In addition or in alternative to any of the foregoing, the audio echo cancellation (AEC) reference generation circuit includes a first linear filter that operates based on a first set of coefficients.

In addition or in alternative to any of the foregoing, the first portion of the displacement feedback corresponds to the first set of coefficients.

In addition or in alternative to any of the foregoing, the loudspeaker displacement estimation circuit includes a linear filter that operates based on a second set of coefficients.

In addition or in alternative to any of the foregoing, the second portion of the displacement feedback corresponds to the second set of coefficients.

In addition or in alternative to any of the foregoing, the displacement feedback generator includes a filter coefficient generator that generates the first set of coefficients and the second set of coefficients based on a calculated loudspeaker displacement indicated by the loudspeaker displacement data.

In addition or in alternative to any of the foregoing, the displacement feedback generator further includes a non-linear lumped parameter model as a function of the calculated loudspeaker displacement indicated by the loudspeaker displacement data and wherein the filter coefficient generator generates the first set of coefficients and the second set of coefficients further based on based on the non-linear lumped parameter model.

In addition or in alternative to any of the foregoing, the non-linear lumped parameter model generates values of a spring constant and a force factor as the function of the calculated loudspeaker displacement.

In addition or in alternative to any of the foregoing, the calculated loudspeaker displacement corresponds to a displacement of a loudspeaker voice coil.

Figure 14A:
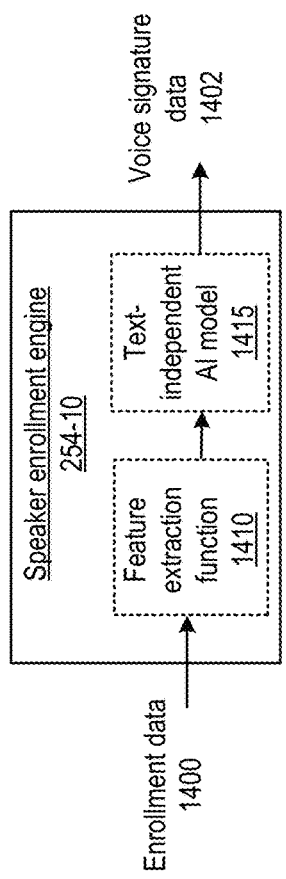
FIGS. 14A & 14B are block diagrams illustrating example audio processing components of a client device in accordance with various aspects described herein.
Figure 14B:
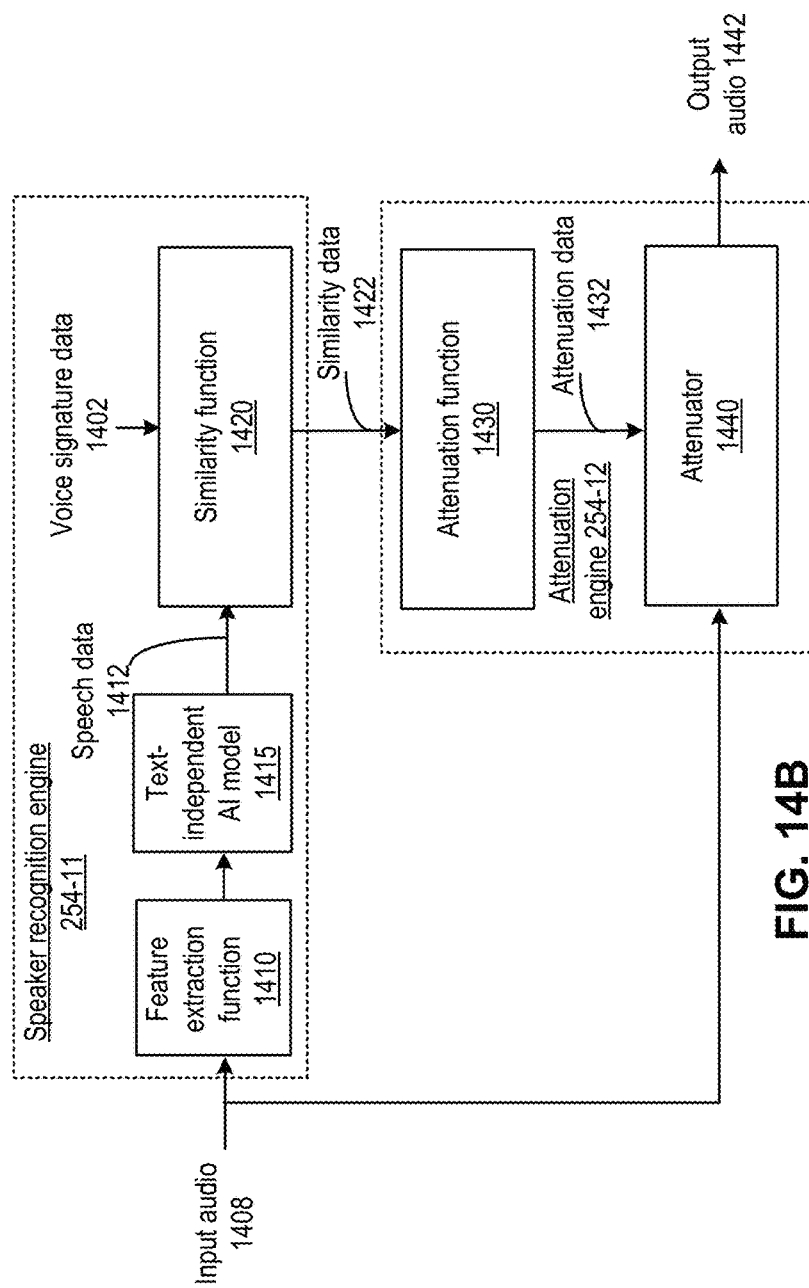

FIGS. 14A & 14B are block diagrams illustrating example audio processing components of a client device in accordance with various aspects described herein. In FIG. 14A, a client device includes a speaker enrollment engine 254-10 that operates via enrollment data 1400 to generate voice signature data 1402.

In various examples, an audio processing circuit includes a speaker enrollment engine 254-10 configured to generate voice signature data, wherein the speaker enrollment engine is trained based on enrollment data associated with a user. Aa speaker recognition engine 254-11 is configured to generate speech data 1412 responsive to a segment of audio data 1408, the speaker recognition engine including a similarity function 1420 configured to generate similarity data 1422 indicating a similarity between the audio data and the voice signature data. An attenuation engine 254-12 is configured to generate attenuation data 1432, based on the similarity data 1422 and an attenuation function 1430 and to attenuate the audio data 1408 based on the attenuation data.

In addition or in alternative to any of the foregoing, the speaker enrollment engine includes a feature extraction function and a text-independent artificial intelligence (AI) model.

In addition or in alternative to any of the foregoing, the text-independent artificial AI model generates a signature vector identifying voice of the user.

In addition or in alternative to any of the foregoing, the attenuation engine passes the audio data when the similarity data indicates the audio data includes recognized speech of the user.

In addition or in alternative to any of the foregoing, the attenuation engine attenuates the audio data when the similarity data indicates the audio data corresponds to other audio and not the recognized speech of the user.

In addition or in alternative to any of the foregoing, the similarity function operates via a cosine similarity algorithm.

In addition or in alternative to any of the foregoing, the attenuation function is a binary function of the similarity data.

In addition or in alternative to any of the foregoing, the attenuation function is a non-binary function of the similarity data.

In addition or in alternative to any of the foregoing, the attenuation function includes a fixed similarity threshold.

In addition or in alternative to any of the foregoing, the attenuation function includes an adjustable similarity threshold.

In various examples, the speaker enrollment engine 254-10 includes, for example, a feature extraction function 1410 and a text-independent AI model 1415 and the voice signature data 1402 includes a 256 bit signature vector or other data structure of sufficient size to, as uniquely as possible, identify the user's voice. This voice signature data 1402 can be used for purposes of speaker verification to verify that additional speech (or other audio input) does or does not correspond to speech by the enrolled user.

Consider the system of FIG. 14B. A speaker recognition engine 254-11 can be used to generate similarity data 1422 indicating a degree of similarity between input audio 1408 and a user's voice signature data 1402. The attenuation engine 254-12 then operates to adjustably attenuate the input audio 1408, based on the similarity data 1422. In this fashion, for example, output audio 1442 that includes recognized speech of the user received by a client device can be passed along for transmission and/or further processing, while audio representing other user's voices, noise and other audio can be attenuated.

In operation, speech data 1412 is generated via a feature extraction function 1410 and the text-independent AI model 1415 in response to a segment of audio data represented by input audio 1408. In various examples, the feature extraction function 1410 and the text-independent AI model 1415 process segments of audio data to generate speech data 1412 that, like the voice signature data 1402, represents the input audio 1408—be it the speech of the user, the voices of other people and/or ambient noise, other audio, etc. In various examples, the speech data 1412 is generated in sliding windows that include several milliseconds or more of audio. The feature extraction function 1410 can be implemented via a technique such as Mel frequency cepstral coefficient (MFCC), linear prediction coefficient (LPC), linear prediction cepstral coefficient (LPCC), line spectral frequencies (LSF), discrete wavelet transform (DWT), perceptual linear prediction (PLP) or other feature extraction technique. The text-independent AI model 1415 can be implemented via a hidden Markov model, Gaussian mixture model, pattern matching algorithm, neural network, or other AI technique.

The similarity function 1420 compares the voice signature data 1402 to the speech data 1412 and generates similarity data 1422 that indicates the degree of similarity between the speech data and the voice signature data. In various examples, the similarity function 1420 can operate via a cosine similarity algorithm or other recognition approach. The attenuation function 1430 generates attenuation data 1432 based on the similarity data 1422, that, for example, indicates an amount of attenuation to be applied to the input audio 1408 at the current time. The attenuator 1440 operates, based on the attenuation data 1432 to generate the output audio 1442 with this level of attenuation.

Figure 14C:
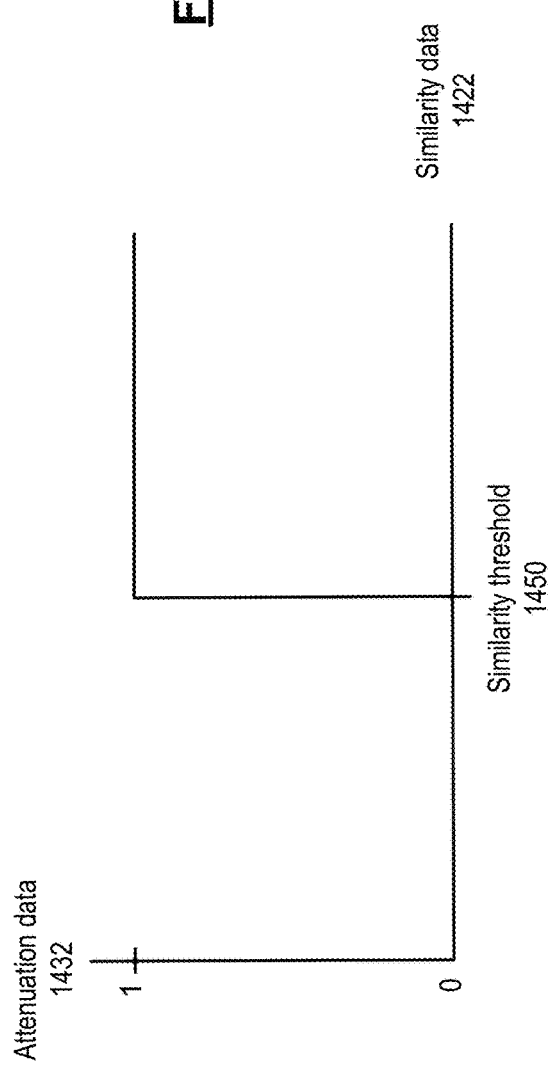
FIGS. 14C & 14D are block diagrams illustrating example attenuation functions in accordance with various aspects described herein.
Figure 14D:
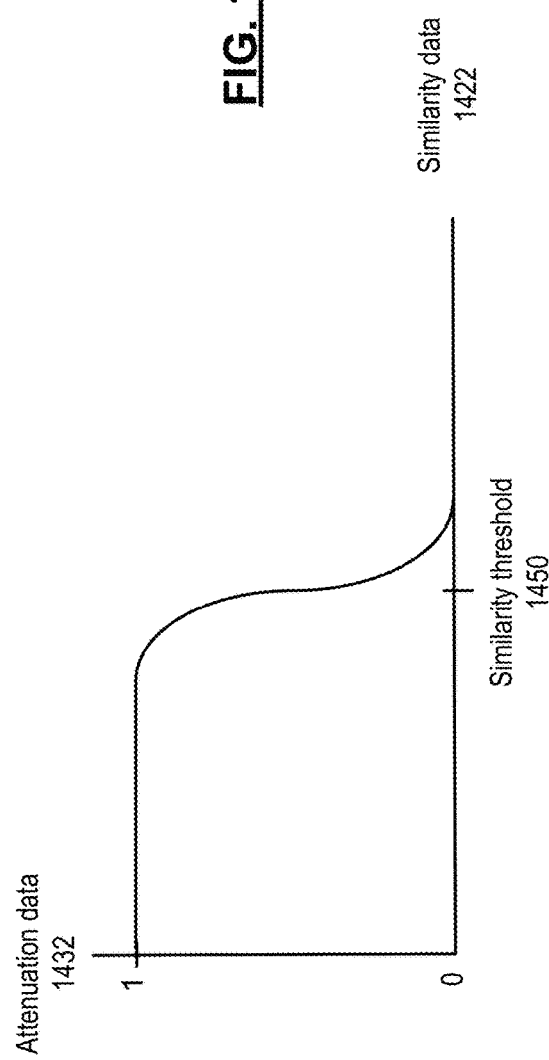

FIGS. 14C & 14D are block diagrams illustrating example attenuation functions in accordance with various aspects described herein. Consider the example of FIG. 14C. In this case a simple attenuation function is configured to generate a binary output corresponding to:

"1"— pass the audio when the similarity exceeds a similarity threshold 1450; or "0"— completely filter out the audio, when the similarity is below the similarity threshold 1450.

In FIG. 14D, a smoother non-binary attenuation function is applied.

The similarity threshold 1450 can be fixed threshold corresponding to, for example, a low FRR. In other examples, the similarity threshold 1450 can be adjusted based on the application of the client device being performed, with different thresholds applied to, for example, voice calls as opposed to AOV usage. In addition or in the alternative, the similarity threshold 1450 can be adjusted based on current voice usage and/or a fit to historical voice usage patterns to bias the attenuation function 1430 toward passing voice during times, periods or conditions where voice input is expected—while biasing the attenuation function 1430 toward attenuating voice during times, periods or conditions where voice input is not expected. In another example, hysteresis can be applied to the similarity threshold 1450 to, for example, to lower the threshold after a speaker's voice is recognized and to raise the threshold again after a period of time where—even in the presence of the lower threshold, no user speech has been detected. Furthermore, during AOV usage, the similarity threshold 1450 can be adjusted between FRR and FAR anchor points based on predicted AOV usage probabilities in a similar fashion to the systems described in conjunction with FIGS. 8-10.

Other adaptive attenuation functions 1430 can be employed as well. After a user's speech has been recognized, the attenuation function 1430 can operate to automatically pass unattenuated audio for a period of time (pass period). This pass period can be predetermined, based on the application of the client device being executed or can be adjusted based on the amount of similarity (e.g., higher similarities yield longer pass periods). This configuration can protect against audio dropouts that might otherwise occur during valid user speech in higher-than-normal noise conditions. Furthermore, machine learning or other AI techniques can be employed to generate the attenuation function 1430.

FIG. 15 illustrates a flow diagram of an example method in accordance with various aspects described herein. In particular, a method 1500 is presented for use with one or more functions and features presented in this disclosure.

Step 1502 includes generating voice signature data via a speaker enrollment engine, wherein the speaker enrollment engine is trained based on enrollment data associated with a user. Step 1504 includes generating speech data, responsive to a segment of audio data and via a feature extraction function and a text-independent AI model. Step 1506 includes generating, based on a similarity function, similarity data indicating a similarity between the audio data and the voice signature data. Step 1508 includes generating, based on the similarity data and an attenuation function, attenuation data. Step 1510 includes attenuating the audio data based on the attenuation data.

In addition or in alternative to any of the foregoing, the speaker enrollment engine includes a feature extraction function and a text-independent artificial intelligence (AI) model.

In addition or in alternative to any of the foregoing, the text-independent artificial AI model generates a signature vector identifying voice of the user.

In addition or in alternative to any of the foregoing, the attenuation function passes the audio data when the similarity data indicates the audio data includes recognized speech of the user.

In addition or in alternative to any of the foregoing, the attenuation function attenuates the audio data when the similarity data indicates the audio data corresponds to other audio and not the recognized speech of the user.

In addition or in alternative to any of the foregoing, the similarity function operates via a cosine similarity algorithm.

In addition or in alternative to any of the foregoing, the attenuation function is a binary function of the similarity data.

In addition or in alternative to any of the foregoing, the attenuation function is a non-binary function of the similarity data.

In addition or in alternative to any of the foregoing, the attenuation function includes a fixed similarity threshold.

In addition or in alternative to any of the foregoing, the attenuation function includes an adjustable similarity threshold.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more examples have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

While for purposes of simplicity of explanation, various methods and processes are shown and described in flow diagrams as a series of blocks, it is to be understood and appreciated that the claimed subject matter is not limited by the order of the blocks, as some blocks may occur in different orders and/or concurrently with other blocks from what is depicted and described herein, provided that the principles of causality are maintained. Moreover, not all illustrated blocks may be required to implement the methods described herein. In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown.

The one or more examples are used herein to illustrate one or more aspects, one or more features, one or more concepts, and/or one or more examples. A physical example of an apparatus, an article of manufacture, a machine, and/or of a process may include one or more of the aspects, features, concepts, examples, etc. described with reference to one or more of the examples discussed herein. Further, from figure to figure, the examples may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The terms "engine" and "module" have been used in the description of one or more of the examples. A module or engine implements one or more functions via a device such as a processor or other processing device or other hardware that may include or operate in association with a memory that stores operational instructions. A module or engine may operate independently and/or in conjunction with software and/or firmware. As also used herein, a module or engine may contain one or more sub-modules, each of which may be one or more modules or engines.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

One or more functions associated with the methods and/or processes described herein can be implemented via a processing module that operates via the non-human "artificial" intelligence (AI) of a machine. Examples of such AI include machines that operate via anomaly detection techniques, decision trees, association rules, expert systems and other knowledge-based systems, computer vision models, artificial neural networks, convolutional neural networks, support vector machines (SVMs), Bayesian networks, genetic algorithms, feature learning, sparse dictionary learning, preference learning, deep learning and other machine learning techniques that are trained using training data via unsupervised, semi-supervised, supervised and/or reinforcement learning, and/or other AI. The human mind is not equipped to perform such AI techniques, not only due to the complexity of these techniques, but also due to the fact that artificial intelligence, by its very definition—requires "artificial" intelligence—i.e. machine/non-human intelligence.

One or more functions associated with the methods and/or processes described herein can be implemented as a large-scale system that is operable to receive, transmit and/or process data on a large-scale. As used herein, a large-scale refers to a large number of data, such as one or more kilobytes, megabytes, gigabytes, terabytes or more of data that are received, transmitted and/or processed. Such receiving, transmitting and/or processing of data cannot practically be performed by the human mind on a large-scale within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can require data to be manipulated in different ways within overlapping time spans. The human mind is not equipped to perform such different data manipulations independently, contemporaneously, in parallel, and/or on a coordinated basis within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can be implemented in a system that is operable to electronically receive digital data via a wired or wireless communication network and/or to electronically transmit digital data via a wired or wireless communication network. Such receiving and transmitting cannot practically be performed by the human mind because the human mind is not equipped to electronically transmit or receive digital data, let alone to transmit and receive digital data via a wired or wireless communication network.

One or more functions associated with the methods and/or processes described herein can be implemented in a system that is operable to electronically store digital data in a memory device. Such storage cannot practically be performed by the human mind because the human mind is not equipped to electronically store digital data.

Although specific examples have been illustrated and described herein, it should be appreciated that any arrangement which achieves the same or similar purpose may be substituted for the examples described or shown by the subject disclosure. The subject disclosure is intended to cover any and all adaptations or variations of various examples. Combinations of the above examples, and other examples not specifically described herein, can be used in the subject disclosure. For instance, one or more features from one or more examples can be combined with one or more features of one or more other examples. In one or more examples, features that are positively recited can also be negatively recited and excluded from the example with or without replacement by another structural and/or functional feature. The steps or functions described with respect to the examples of the subject disclosure can be performed in any order. The steps or functions described with respect to the examples of the subject disclosure can be performed alone or in combination with other steps or functions of the subject disclosure, as well as from other examples or from other steps that have not been described in the subject disclosure. Further, more than or less than all of the features described with respect to an example can also be utilized.

What is claimed is:

1. An audio processing circuit of a client device comprising:
   an audio front end (AFE) of the audio processing circuit configured to generate audio data in response to audio signals received from one or more microphones;
   one or more special purpose engines (SPEs) of the audio processing circuit configured to:
   generate prediction data for a current time via a an always-on voice (AOV) usage model, wherein the AOV usage model is utilized as a function of time of day;
   generate bias adjustment data corresponding to the current time of day, based on the prediction data;
   adjust a threshold of an audio event recognition engine of the audio processing circuit for the current time of day, based on the prediction data, wherein the audio event recognition engine is a wake-word recognition engine; and
   determine, via the audio event recognition engine and based on audio data, when an audio event is detected based on the generated bias adjustment data and the adjusted threshold.

2. The audio processing circuit of claim 1, wherein the prediction data includes always-on voice AOV prediction data, wherein the AOV usage model is generated based on historical data of AOV usage, wherein the threshold is a wake-word threshold and wherein the audio event corresponds to detection of a wake-word.

3. The audio processing circuit of claim 2, wherein the historical data of AOV usage is based on times of wake-word detections.

4. The audio processing circuit of claim 3, wherein the one or more SPEs further includes a query recognition engine that generates recognized query data based on the audio data after the wake-word is detected.

5. The audio processing circuit of claim 4, wherein the historical data of AOV usage is further based on the recognized query data.

6. The audio processing circuit of claim 5, wherein the wake-words are only considered in the historical data of AOV when followed by the recognized query data.

7. The audio processing circuit of claim 2, wherein the wake-word recognition engine includes a model anchored by two sets of posterior parameters, only differing in threshold.

8. The audio processing circuit of claim 7, wherein the two sets of posterior parameters include a false acceptance rate (FAR) biased threshold and a false rejection rate (FRR) biased threshold.

9. The audio processing circuit of claim 8, wherein the wake-word threshold of the wake-word recognition engine is adjusted between the FAR biased threshold and the FRR biased threshold.

10. The audio processing circuit of claim 9, wherein the wake-word threshold of the wake-word recognition engine is adjusted, based on the prediction data, to match current estimated usage conditions.

11. A method comprising:
generating always-on voice (AOV) prediction data for a current time via an AOV usage model of an audio processing circuit, wherein the AOV usage model is utilized as a function of time of day;
generating bias adjustment data corresponding to the current time of day, based on the AOV prediction data;
adjusting a wake-word threshold of a wake-word recognition engine of the audio processing circuit for the current time of day, based on the AOV prediction data; and
determining, via the wake-word recognition engine and based on audio data, when a wake-word is detected based on the generated bias adjustment data and the adjusted threshold.

12. The method of claim 11, wherein the AOV usage model is generated based on historical data of AOV usage.

13. The method of claim 12, wherein the historical data of AOV usage is based on times of wake-word detections.

14. The method of claim 13, further comprising:
generating recognized query data based on the audio data after the wake-word is detected.

15. The method of claim 14, wherein the historical data of AOV usage is further based on the recognized query data.

16. The method of claim 15, wherein the wake-words are only considered in the historical data of AOV when followed by the recognized query data.

17. The method of claim 11, wherein the wake-word recognition engine includes a model anchored by two sets of posterior parameters, only differing in threshold.

18. The method of claim 17, wherein the two sets of posterior parameters include a false acceptance rate (FAR) biased threshold and a false rejection rate (FRR) biased threshold.

19. The method of claim 18, wherein the wake-word threshold of the wake-word recognition engine is adjusted between the FAR biased threshold and the FRR biased threshold.

20. The method of claim 19, wherein the wake-word threshold of the wake-word recognition engine is adjusted, based on the AOV prediction data, to match current estimated AOV usage conditions.

* * * * *